(12) United States Patent
Heinze et al.

(10) Patent No.: US 8,026,814 B1
(45) Date of Patent: Sep. 27, 2011

(54) WIRELESS MESH NETWORK FOR AN ASSET TRACKING SYSTEM

(75) Inventors: Eric T. Heinze, Pewaukee, WI (US); Gregg J. Haensgen, Menomonee Falls, WI (US); Feng Gao, Buffalo Grove, IL (US); Brian Eckelman, Waukesha, WI (US); Wyndham F. Gary, Jr., Whitefish Bay, WI (US); Ajay Malik, Santa Clara, CA (US); Zeljko John Serceki, Hartland, WI (US)

(73) Assignee: Pinpoint Technologies Inc., Brookfield, WI (US)

( * ) Notice: Subject to any disclaimer, the term of this patent is extended or adjusted under 35 U.S.C. 154(b) by 763 days.

(21) Appl. No.: 12/036,136

(22) Filed: Feb. 22, 2008

Related U.S. Application Data

(60) Provisional application No. 60/961,894, filed on Jul. 25, 2007.

(51) Int. Cl.
 *G08B 13/14* (2006.01)
(52) U.S. Cl. ........... 340/572.1; 340/539.13; 340/539.21; 340/573.4; 340/10.1

(58) Field of Classification Search ............... 340/572.1, 340/572.4, 539.13, 539.21, 568.1, 571, 573.3, 340/573.4, 539.23, 10.1, 10.3
See application file for complete search history.

(56) References Cited

U.S. PATENT DOCUMENTS

| | | | |
|---|---|---|---|
| 5,793,290 A | 8/1998 | Eagleson et al. | |
| 7,098,792 B1 | 8/2006 | Ahlf et al. | |
| 7,180,420 B2 * | 2/2007 | Maurer | 340/572.1 |
| 7,274,294 B2 | 9/2007 | Heinze et al. | |
| 7,365,645 B2 | 4/2008 | Heinze et al. | |
| 2004/0169587 A1 * | 9/2004 | Washington | 340/573.1 |
| 2006/0125631 A1 * | 6/2006 | Sharony | 340/539.13 |
| 2007/0247286 A1 * | 10/2007 | Drago et al. | 340/10.4 |

* cited by examiner

*Primary Examiner* — Hung T. Nguyen
(74) *Attorney, Agent, or Firm* — Foley & Lardner LLP

(57) ABSTRACT

An asset tracking system includes a station, transmitting points, and an asset tag. The asset tag can be used for communicating with the transmitting points to form a mesh network. The station receives data associated with signal strengths between transmitting points and asset tag. The station analyzes the data associated with a number of the transmitting points and determines the location of the asset tag.

20 Claims, 32 Drawing Sheets

18

|   | AP10 | AP9 | AP8 | AP7 | AP6 | AP5 | AP4 | AP3 | AP2 | AP1 | AP0 | Vector |
|---|------|-----|-----|-----|-----|-----|-----|-----|-----|-----|-----|--------|
| 0 | 1 | 1 | 1 | 1 | 1 | 1 | 1 | 0 | 0 | 0 | 0 | 0x07f0 |
| 1 | 1 | 1 | 1 | 1 | 1 | 1 | 1 | 0 | 1 | 1 | 0 | 0x07f6 |
| 2 | 1 | 1 | 1 | 1 | 1 | 1 | 1 | 0 | 0 | 0 | 0 | 0x07f0 |
| 3 | 1 | 1 | 1 | 1 | 1 | 1 | 1 | 0 | 0 | 0 | 0 | 0x07f0 |
| 4 | 1 | 1 | 1 | 1 | 1 | 1 | 1 | 0 | 0 | 0 | 0 | 0x07f0 |
| 5 | 0 | 1 | 1 | 1 | 1 | 1 | 1 | 1 | 1 | 0 | 1 | 0x03fd |
| 6 | 0 | 1 | 1 | 0 | 1 | 1 | 1 | 1 | 1 | 0 | 0 | 0x037c |

FIG. 11

|   | AP10 | AP9 | AP8 | AP7 | AP6 | AP5 | AP4 | AP3 | AP2 | AP1 | AP0 | Vector |
|---|------|-----|-----|-----|-----|-----|-----|-----|-----|-----|-----|--------|
| T | 0 | 0 | 1 | 0 | 1 | 1 | 1 | 1 | 0 | 0 | 1 | 0x0179 |

FIG. 12

| Location 0 | Location 1 | Location 2 | Location 3 | Location 4 | Location 5 | Location 6 |
|------------|------------|------------|------------|------------|------------|------------|
| 0x0689 | 0x068f | 0x0689 | 0x0689 | 0x0689 | 0x0284 | 0x0205 |

FIG. 13

|   | AP10 | AP9 | AP8 | AP7 | AP6 | AP5 | AP4 | AP3 | AP2 | AP1 | AP0 | Vector |
|---|------|-----|-----|-----|-----|-----|-----|-----|-----|-----|-----|--------|
| T | 1 | 1 | 1 | 1 | 1 | 1 | 1 | 0 | 0 | 0 | 0 | 0x07f0 |

FIG. 14

| Location 0 | Location 1 | Location 2 | Location 3 | Location 4 | Location 5 | Location 6 |
|---|---|---|---|---|---|---|
| 0x00 | 0x0006 | 0x00 | 0x00 | 0x00 | 0x040d | 0x048c |

FIG. 15

| | AP10 | AP9 | AP8 | AP7 | AP6 | AP5 | AP4 | AP3 | AP2 | AP1 | AP0 | Vector |
|---|---|---|---|---|---|---|---|---|---|---|---|---|
| T | 0 | 1 | 1 | 1 | 1 | 1 | 1 | 1 | 0 | 0 | 1 | 0x03f9 |

FIG. 16

| Location 0 | Location 1 | Location 2 | Location 3 | Location 4 | Location 5 | Location 6 |
|---|---|---|---|---|---|---|
| 0x0409 | 0x040f | 0x0409 | 0x0409 | 0x0409 | 0x04 | 0x085 |

FIG. 17

| 1    2  Tag 1  4    3 | FC2FE | FD851 | FD84E | FD855 | FC349 |
|---|---|---|---|---|---|
| | .091  4.8e-4<br>46<br>.10    .043 | .98m  .76m<br>40<br>.97m  .69m | .042    .020<br>50<br>4.0e-4  .067 | .24m  4.0e-3<br>60<br>.23m    .13 | .031  2.2e-3<br>68<br>.016    .094 |
| | .15m    .011<br>47<br>.20m2    .14 | .98m  .76m<br>40<br>.97m  .69m | .042    .020<br>50<br>4.0e-4  .067 | .10    .083<br>63<br>.11    .099 | .031  2.2e-3<br>68<br>.016    .094 |
| | .15m    .011<br>47<br>.20m2    .14 | .98m  .76m<br>40<br>.97m  .69m | .053    .10<br>47<br>.023    .13 | .029    .070<br>64<br>.031    .047 | .012  1.1e-3<br>69<br>5.6e-3  .057 |
| | .14m23.2e-4<br>45<br>.16    .047 | .98m  .76m<br>40<br>.97m  .69m | .042    .020<br>50<br>4.0e-4  .067 | .054    .20<br>65<br>.040    .13 | .13    .040<br>67<br>.10    .23m |
| | .14m23.2e-4<br>45<br>.16    .047 | .98m  .76m<br>40<br>.97m  .69m | .038    .040<br>46<br>.041    .067 | .10    .083<br>63<br>.11    .099 | .012  1.1e-3<br>69<br>5.6e-3  .057 |

FIG. 18

| Location name | Location ID | Number of Count | % |
|---|---|---|---|
| WebEx | 464171 | 695 | 69.5 |
| Office 1 | 464170 | 181 | 18.1 |
| Manager's office | 464166 | 40 | 4.0 |

| | WebEx | calibrated location | (9.0, 3.1) |
| | Office 1 | calibrated location | (3.0, 2.5) |
| | Manager's office | calibrated location | (6.0, 2.5) |
| | Office 2 | testing location | (6.6, 3.0) |

$$\bar{x} = \frac{9.0 \times 695 + 3.0 \times 181 + 6.0 \times 40}{1000} = \frac{6255 + 543 + 240}{1000} = 7.038$$

$$\bar{y} = \frac{3.1 \times 695 + 2.5 \times 181 + 2.5 \times 40}{1000} = \frac{2154.5 + 452.5 + 100}{1000} = 2.707$$

| Location name | Location ID | Number of Count | x | y |
|---|---|---|---|---|
| Mgrs Conference | 464166 | 323 | 6.0 | 2.5 |
| Conference Room | 464169 | 112 | 3.0 | 1.0 |
| Office 2 | 464170 | 48 | 3.0 | 2.5 |

FIG. 22

Location ID: 464166    Mgrs Conference    (6.0, 2.5)

Location ID: 464169  ◯  Conference Room   (3.0, 1.0)

Location ID: 464170  ◉  Office 2          (3.0, 2.5)

■  Testing location   (4.5, 2.6).

$$\bar{x} = \frac{6.0 \times 323 + 3.0 \times 112 + 3.0 \times 48}{500} = \frac{1938 + 336 + 144}{500} = 4.836$$

$$\bar{y} = \frac{2.5 \times 323 + 1.0 \times 112 + 2.5 \times 48}{500} = \frac{807.5 + 112 + 120}{500} = 2.079$$

FIG. 23

Track Assets from a PDA

| Property | Value |
| --- | --- |
| PinPoint Type | Resource |
| Resource Type | IV Pumps |
| Resource | Baxter IV Pump Flo-Gard 62... |
| Description | Serial #125678946354 |
| Tag Serial # | 168430351 |
| Tag IP | 010.010.011.015 |
| Enabled | True |
| Tag Type | T20 Personnel/Asset Tag |
| Battery Type | 6V Li 1000mAh |
| Chirp Rate | 3 |
| Call Button | False |
| External Power | False |
| Motion Detect | False |
| Tamper | False |
| Sound File | (none) |
| Sound Cleared File | (none) |

Select Items | Properties

FIG. 34

| Property | Value |
|---|---|
| PinPoint Type | ResourceFolder |
| Folder Name | Medical Equipment |
| Group Color | |

| Property | Value |
|---|---|
| PinPoint Type | Location |
| Location ID | 464074 |
| Location Name | Waiting Room |
| Path | Locations\B1 |
| Rule | |
| Floor Plan ID | 464054 |
| Floor Plan X | 18 |
| Floor Plan Y | 20 |

| Property | Value |
|---|---|
| PinPoint Type | EntryAlert |
| Alert Type | Entry |
| Alert ID | 1000 |
| Alert Description | Doctor Eckleman in Surgery |
| Location | Surgery |
| Resource | Doctor Eckleman |
| Sound File | |
| Sound Cleared File | |

| Property | Value |
|---|---|
| PinPoint Type | Report |
| Report ID | a653f35c-b2d0-41f8-8169-f0cb96dc |
| Report Name | JONSNEWREPORT |
| Category | 0 |
| Owner | |
| User Level | |
| Creation Date | 2005-06-30 PM 03:29:08 |
| Modified Date | 2005-06-30 PM 03:29:08 |
| Report Value | <?xml version="1.0" encoding="utf- |

FIG. 35

| Title | Icon | Description |
|---|---|---|
| Entry | | Activated when a resource enters a particular Location. This might be used to trigger an Alert when a visitor enters a restricted area. Clears when the resource leaves the specified location. |
| Exit | | Activated when a resource exits a particular Location. You might define an Alert that would be fired when a laptop leaves a facility. Clears when the resource returns to the location. |
| Stationary | | Activated when a resource is in a particular location for more than the indicated period of time. This might be used in a truck yard to indicate whether a truck has been sitting in a loading dock for too long. |
| Timeout | | Activated when a resource has not been heard from in a particular Location or any other Location for a certain period of time. |
| Transition | | Activated when a resource moves from one specific location to another. |
| Escort | | Activated when the first resource in a pair of resources enters a particular location without the second resource in the pair. For example, if a visitor were to enter a chip fabrication area without his or her escort. |
| Friend | | Activated when two resources in a pair are not in a particular Location together. For example, an Alert could be fired if a truck driver were to leave a truck yard without the appropriate truck. |
| Foe | | Activated when two resources are in a particular location together, but should not be. |

FIG. 44

WIRELESS MESH NETWORK FOR AN ASSET TRACKING SYSTEM

This application is an application claiming the benefit under 35 U.S.C. 119(e), to U.S. Application 60/961,894, filed Jul. 25, 2007, which is incorporated herein by reference in its entirety.

BACKGROUND

The present specification relates to an asset tracking system utilizing wireless networking technology. More particularly, the present invention relates to an asset tracking system that utilizes asset tags, reference tags and gateway tags to create a wireless mesh network for tracking assets.

Asset tracking systems can be utilized to locate, track and secure valuable, moveable assets. U.S. patent application Ser. Nos. 11/043,714 and 11/378,804 assigned to the assignee of the present application disclose asset tracking systems used with a mobile locator and are herein incorporated in their entirety by reference. Generally, an asset tracking system includes electronic tags that utilize low power radio signals to provide instantaneous or somewhat instantaneous location of any asset or person. The system can maintain a complete log of movements for auditing security, generate instant inventory of all tagged assets, trigger alerts if the tag leaves or enters specified areas, and monitor and control access to and movements of assets. These conventional systems can be utilized in hospitals, industrial/commercial environments and high level security environments.

Wireless, battery powered tags can be attached to various assets for real-time or quick locating of and asset and personal management throughout the facility. The tags include a tamper detection security feature which prevents theft and loss of equipment by causing an alert when the tag is removed from the asset. Additionally, the tags may incorporate a low frequency transmitter that can be configured to provide a low frequency signal that communicates with door alarms to stop equipment or people from leaving the facility or areas of the facility. Tags can be configured to lock down doors, and elevators, and door alarms, and display alerts to an end user.

Management of assets and resources is accomplished by a positioning software suite of end user applications and services. The software suite can be operated on a central station and includes databases for tracking locations of assets and inventory.

There is a need for an asset tracking system that allows accurate efficient tracking of mobile equipment and people. There is also a need for an asset tracking system that can improve the security of assets. There is also a need for an asset tracking system that can improve equipment availability. There is also a need for an asset tracking system that can reduce costs attributed to misappropriated equipment. There is also a need for an asset tracking system that can utilize existing asset tracking infrastructure and wireless access points. There is also a need for an asset tracking system that can be easily deployed in a desired coverage area that has no asset tracking infrastructure and wireless access points. There is also a need for an asset tracking system that can improve asset utilization. There is also a need for an asset tracking system that will prevent equipment inventory shrinkage. There is yet another need for an asset tracking system that will recommend timely preventative maintenance. Further still, there is a need for an easy to use interface for an asset tracking system.

SUMMARY

An exemplary embodiment relates to an asset tracking system used to locate, track, or secure valuable moveable assets within a facility. The asset tracking system includes workstations (e.g., personal computers, notebooks, etc.), transmitting points and tags units. The tag units communicate with the transmitting points. The station receives the data associated signal strengths between the transmitting points and tags. The station analyzes the data associated with a number of the transmitting points and determines the locations of the tag units.

According to another embodiment, upon initial installation, a tamper detect circuit is activated. The tag unit begins looking for a default network to allow the user ease in auto enrolling the tag onto the new network. The system recognizes the tag unit in response to the communication activation and automatically enrolls the tag onto the new network.

According to yet another embodiment, the locations of the assets are determined using calibration data collected during installation from the tags, historical movements, and/or statistical analysis. A location algorithm can be used for calibration purposes utilizing access point map matrixing, centering, averaging, or vectoring. Once the location of the asset is determined, it can be automatically enrolled in a database and displayed on a map utilizing color coding for various departments and activities. Over time the data collected for calibration may drift or shift, therefore the data collected becomes a moving average of the tracked information.

According to another embodiment, the asset tracking system may be set up on its own virtual local area network to segment it from the facility's existing network and other applications.

According to another embodiment, the asset tracking system is configured to form a wireless mesh network comprising reference tags. The reference tags provide fixed reference points for the asset tag. Additionally, at least one gateway tag may be used to communicate data from the mesh network to the station via a network connection.

In still another exemplary embodiment, during initial set up, a resource profile is assigned to the asset for categorization purposes. Additionally, the location of the assets are grouped with respect to a location type or room type to monitor workflow, the time an asset spends in a location, and the movement of the asset within the facility.

In another embodiment, a motion flag is sent from the station when a tag unit is moved. A routing list may be generated with regards to these groups for preventative maintenance purposes.

In a further exemplary embodiment, tag units emit a very low frequency transmission with a unique identification for use in locking and unlocking doors. The low frequency transmission may also be used to help determine the location of the asset by virtue of the fact that the VLF transmission is short range (e.g., 5-8 feet).

In still another exemplary embodiment, an asset tracking system includes wireless access points that are at know coordinates. When calculations do not return a precise coordinate, a mean value is calculated and designated as a between or near by point.

In another exemplary embodiment, additional wireless positioning input points may be added to help determine the coordinate location of the asset. These positioning input points also monitor noise interference on the wireless network.

In yet another exemplary embodiment, an end user device, such as a laptops or hand held computers is used to communicate with the station in order to perform an analysis of the data or view data associated with the asset tracking system.

BRIEF DESCRIPTION OF THE DRAWINGS

FIGS. 11 thru 17 are tables of data used for access point mapping for use in an asset tracking system according to further exemplary embodiments.

FIG. 18 is a table of additional exemplary set data used for access point location determination in an asset tracking system according to further exemplary embodiments.

FIG. 22 is a table showing examples of access points being positioned near by or between other access points according to another exemplary embodiment.

FIG. 23 is a graphical representation showing examples of access points being positioned near by or between other access points according to another exemplary embodiment.

FIG. 33 and FIG. 34 are screen shots background color being utilized in a tree to alert the user to messages to be used in an information center illustrated in FIG. 26 according to further exemplary embodiments.

FIG. 35 is a screen shot of property windows for use in an information center illustrated in FIG. 26 according to an exemplary embodiment.

FIG. 44 is a screen shot of a table of watch alert icons to be used in information center as illustrated in FIG. 26 according to another exemplary embodiment.

DETAILED DESCRIPTION OF EMBODIMENTS

Figure 1A:
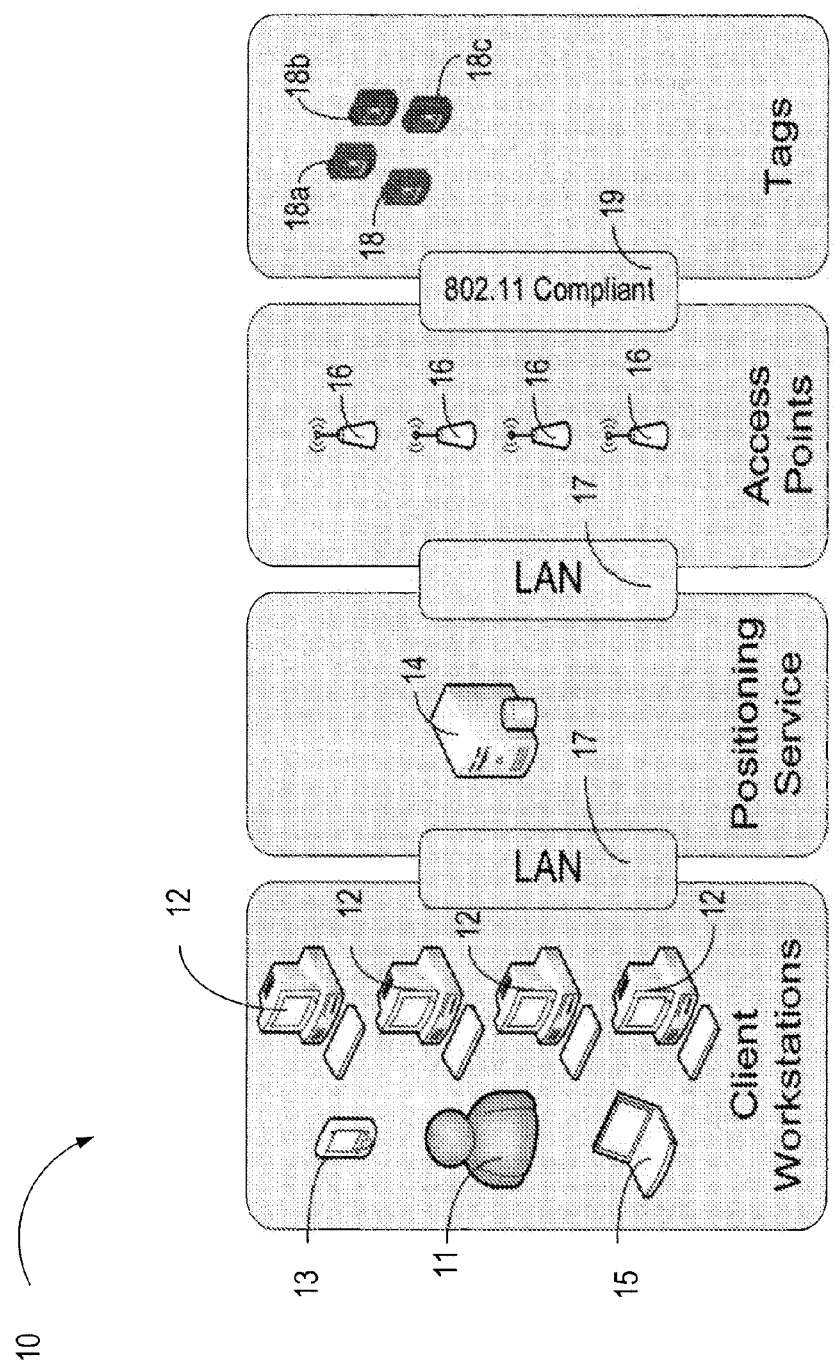
FIG. 1A is a general block diagram of an asset tracking system according to an exemplary embodiment.

Referring to FIG. 1A, asset tracking system 10 is illustrated according to an exemplary embodiment. As used in this application, asset tracking system 10 can be used to track people or assets. Asset tracking system 10 has been configured to use IEEE 802.11b wireless networking standard. Employing this standard, advantageously allows asset tracking system 10 to utilize an existing wireless infrastructure 19, however, other wireless standards could be employed without departing from the scope of the invention.

Generally, asset tracking system 10 includes one or more transmitting points, such as wireless access points 16 and one or more tag units 18. Access points 16 broadcast wireless signals, over existing 802.11b wireless infrastructure 19, that can be received by tag units 18. Tag units 18 measure and collect relative signal strengths of broadcasted probe response signals from multiple transmitting points, such as access points 16. Tag units 18 connect with wireless access point 16 and communicate the collected signal strengths to a processing station, such as a server hosting positioning service 14 through local area network (LAN) 17. Positioning service 14 may be a PC, laptop or server, that includes one or more software suites and serves as a positioning/location engine for tag units 18 and transmitting points.

Positioning service 14 acts as a location engine and determines the location of tag unit 18 based on calibration data collected during initial installation, historical movements of tag unit 18, and statistical analysis. The location of the asset is published to end user applications and preserved in a database for future reporting and analysis. Users 11 can view the location data on end-user devices, such as workstation 12, PDA's 13, and laptops 15. Additionally, the location data can be used with a software kit for integration with third party applications, such as warehouse management and facility information systems. In an alternative embodiment, tag unit 18 may be configured to perform the analysis of the positioning service 14 as described below and act as a self locating location engine. The location, as determined by tag unit 18, is delivered to a database for reporting and analysis and published to end user applications.

In an exemplary embodiment, as illustrated in FIG. 1A asset tracking system 10 comprises client workstation(s) 12 which receives data associated with signal strengths between wireless access points 16 and tag unit 18. Workstation 12 analyzes the data associated with a number of transmitting access points 16 and determines the locations of tag unit 18. As stated earlier, positioning service 14 determines the location of tag unit 18 based on the following: calibration data collected during initial installation; historical movements of tag unit 18; and statistical analysis, or any combination thereof. Furthermore, positioning service 14 does not necessarily need to use calibration data collected during installation for calculating locations, instead, it can make use of the dynamic sample points from each reference point (e.g., transmitting points and tag units) to perform location calculations.

Figure 2:
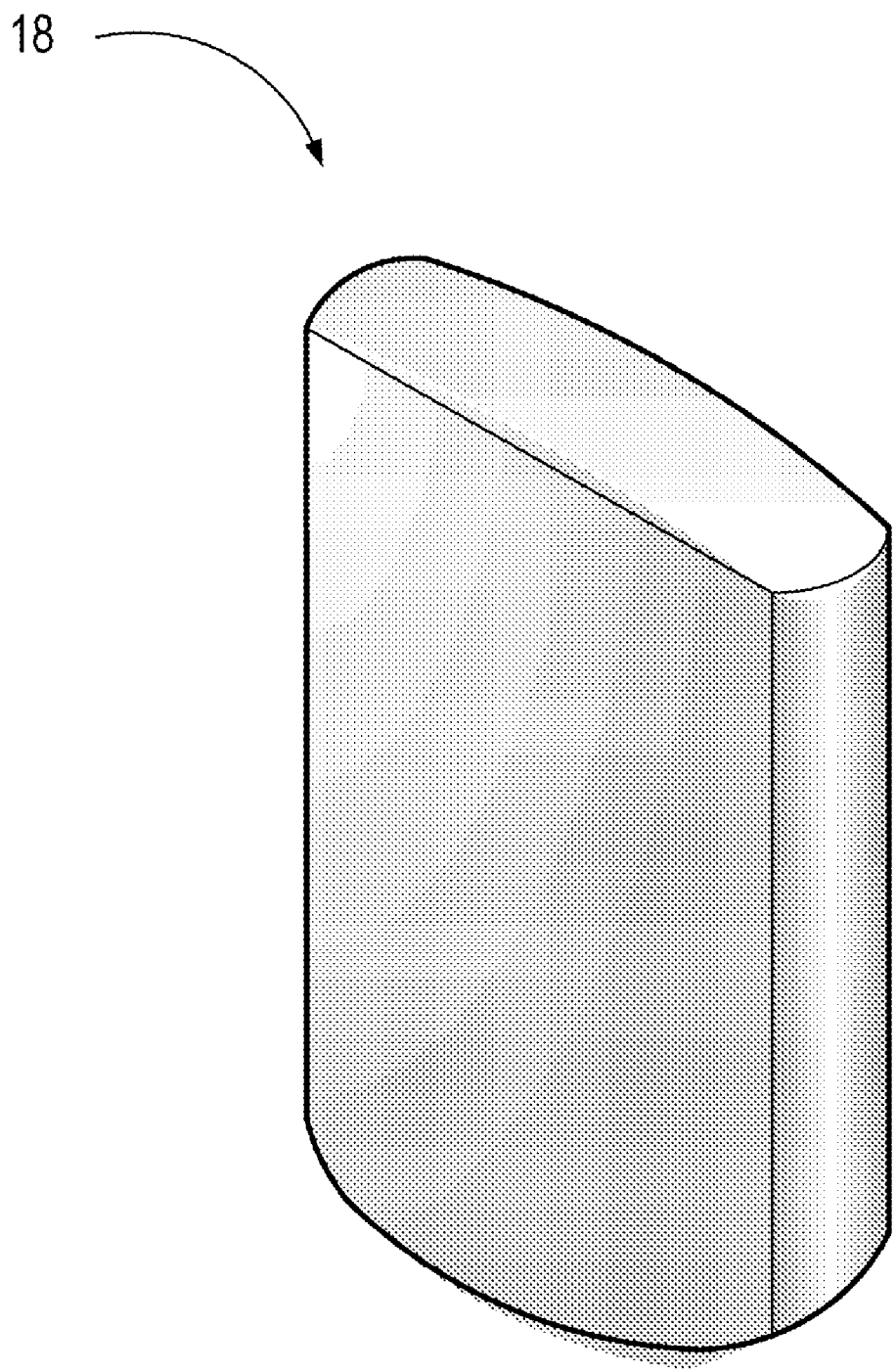
FIG. 2 is a front view of a tag unit for use in the asset tracking system illustrated in FIG. 1 according to another exemplary embodiment.

With reference to FIG. 2, tag unit 18 is a small battery powered wireless transceiver which collects probe responses from transmitting points, such as standard wireless access points (AP) 16, positioning input points (PIP) 30 and from other tag types discussed below. When tag unit 18 is configured to perform the functions of asset tag 18a it may be attached to various assets and medical equipment for real-time locating and asset management. Tag unit 18 (referring to all types of tags) may be configured to be compatible with IEEE 802.11b wireless communication systems and designed for minimal bandwidth, enabling user 11 to utilize existing wireless local area network (WLAN) infrastructure 19. Tag unit 18 is managed through a mobile management resource management software.

Referring to FIGS. 1A-1D, in an exemplary embodiment, tag units 18 may consist of three different types of tags, including: an asset tag 18a, a reference tag 18b and a gateway tag 18c. Combinations of these tags may be configured in various arrangements to form wireless mesh networks that communicate with a processing station, such as positioning service 14, via a network connection for determining the location of anyone of the tags. Asset tag 18a operates by collecting information about its surroundings via a wireless connection, such as 802.11a/b/g. Asset tag 18a conveys this information to another device capable of determining the location of asset tag 18a based on the collected information. For example, asset tag 18a sends probe request messages to transmitting points, such as wireless access point 16 and reference tag 18b, in an 802.11 network by. Reference tag 18b and/or AP 16 respond with probe response messages from which asset tag 18a determines the received signal strength indication (RSSI) of each response signal. Asset tag 18a collects the RSSI information and communicates the information to either AP 16 or reference tag 18b. The information it is eventually communicated to a processing station, such as positioning service 14, that is capable of determining the location of asset tag 18a from the collected data.

In addition to, or in place of, RSSI information, asset tag 18a may be configured to collect, use and send time of flight (TOF) information to facilitate location of asset tag 18a. In order to eliminate reflections and other multipath issues, reference tags 18b (including gateway tags 18c) and asset tag 18a can determine a rudimentary TOF for each message sent. The message with the lowest TOF is likely the most direct path between reference tag 18b and asset tag 18a. To calculate the TOF, reference tag 18b timestamps its message with an incremented value. Asset tag 18a timestamps the message with its own incremented value when the message is received. Asset tag 18a looks at the difference between each of the time stamps of the messages received from reference tag 18b and determines which spent the least amount of time traveling to asset tag 18a. Once asset tag 18a has found the signal with the shortest transmission time, asset tag 18a may then determine that signal's RSSI and send the RSSI information to positioning service 14.

Figure 1B:
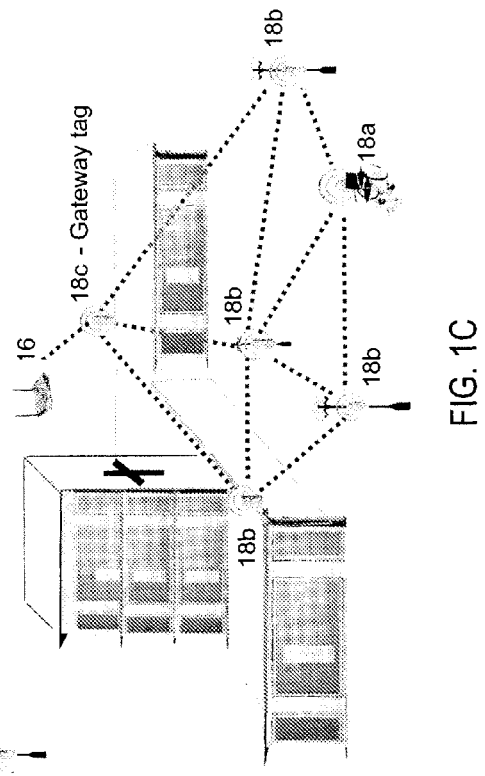
FIGS. 1B-1D are illustrations of various configurations utilizing asset tags, reference tags and gateway tags to establish a wireless mesh network for asset tracking.
Figure 1C:
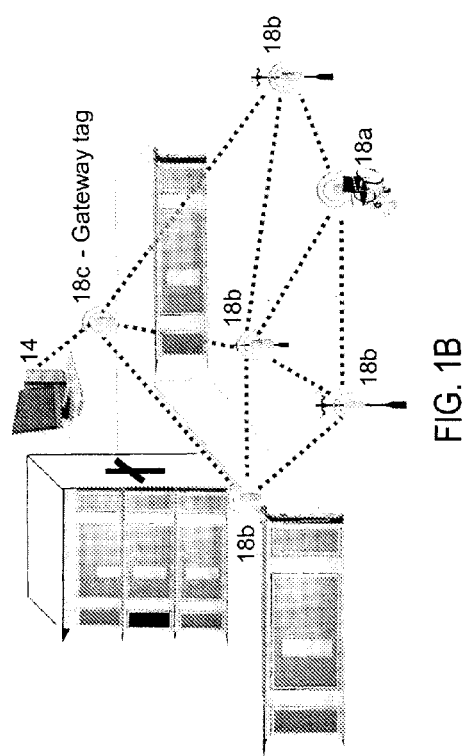
Figure 1D:
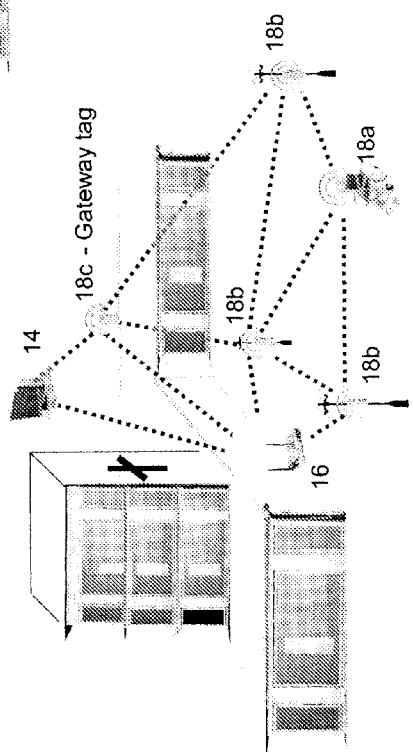

Asset tag 18a, reference tag 18b and gateway tag 18c ideally use the same circuit board and firmware to create a tag that can be tracked, a tag that can serve as a fixed reference and a tag that can act as a gateway to a network, such as LAN 17 or a WLAN. Asset tag 18a, reference tag 18b and gateway tag 18c are configured to communicate with one another to form a wireless mesh network as shown in FIGS. 1B-1D. Reference tag 18b is configured to act as a signal source, asset tag 18a collects the signals from reference tag 18b and the collected signals are sent, via the wireless network to a processing station, such as positioning service 14, that analyses the signals from the reference tags to determine the position of asset tag 18a.

A site for tracking assets can be created using a series of reference tags 18b that are meshed together as in FIGS. 1B-1D. In a mesh configuration, asset tag 18a will transmit packets of collected information to reference tag 18b, which may then transmit the collected packets to another reference tag 18b and so on until the packets are delivered to the network, such as LAN 17, and then to positioning service 14. The packets may be delivered to the network via a wired or wireless connection from gateway tag 18c, as in FIG. 1B, access point 16, as in FIG. 1C, or a combination of the two, as in FIG. 1D.

Gateway tag 18c operates much like reference tag 18b with the additional feature of providing a transport mechanism for delivering the collected packets of information to another medium, such as Ethernet. Gateway tag 18c and reference tags 18b can communicate with one another to form a wireless mesh network, as in FIGS. 1B-1D. Asset tag 18a collects and sends packets of information to reference tag 18b, which repeats the information packets to another reference tag 18b until it is finally delivered to gateway tag 18c. Gateway tag 18c conveys the information packets to another supported media. Reference tags 18b and/or gateway tags 18c can be used in lieu of a wireless communications network, as in FIG. 1B. If no network is installed, the reference tags 18b can be used 18a to send information packets from asset tag 18a to gateway tag 18c, thereby allowing asset tag 18a to communicate with a processing station, such as positioning service 14. This deployment model allows asset tracking in areas that do not have a wireless communications infrastructure. Additionally, reference tags 18b and/or gateway tags 18c can be used to expand the coverage area of a wireless network or to increase the density of coverage within a coverage area.

As can be seen from these exemplary illustrations, various configurations are possible, some of which do not require gateway tag 18c, as shown in FIG. 1C, and some of which do not require AP 16, as shown in FIG. 1B. FIGS. 1B-1D show the coverage area devices in communication with positioning service 14. Position service 14 may be located on site or may be located remotely with respect to the coverage area. Furthermore, gateway tag 18c may use any type of network protocol or network technology, wired or wireless, to communicate with positioning service 14.

With reference to FIG. 1B, in several exemplary embodiments in which gateway tag 18c is used to communicate with a processing station, such as positioning service 14, gateway tag 18c may be configured to communicate using generic packet radio service (GPRS), worldwide interoperability for microwave access (WiMAX) or any other wide area network (WAN). Gateway tag 18c may also be configured to communicate with the processing station using a radio access network (RAN).

With reference to FIGS. 1-4, in an exemplary embodiment, asset tag 18a wakes up periodically and sends probe requests to all AP 16, PIP 30, and other tag types in the vicinity. AP 16, PIP 30 and the other tags types send probe responses from which asset tag 18a collects all RSSI (received signal strength indication) values and associates with specific AP 16, PIP 30 and other tag types and transmits the RSSI position information to positioning service 14 on local area network (LAN) 17. Positioning service 14 then determines the location of asset tag 18a with respect to AP 16, PIP 30 and the other tag types. PIP 30 can be similar to AP 16 and provides responses to asset tag 18a as described in more detail below. The location of the other tag types (reference tag 18b and gateway tag 18c) may also be found using a this and other similar procedures described below. Alternatively, asset tag 18a transmits a signal to a transmitting point (e.g., AP 16, reference tag 18b, gateway tag 18c and/or PIP 30) and the transmitting point determines the RSSI for each signal, and collects the RSSI information and transmits the RSSI information to positioning service 14.

To associate a transmitting point (AP 16, PIP 30, reference tag 18b and/or gateway tag 18c), asset tag 18a must first issue an association request. The transmitting point then sends out an association response, which notifies tags 18 of the association ID. Once asset tag 18a is associated, it can send out a packet containing all of the RSSI values collected. Association requests may also be issued by the other types of tags in order to form associations with other location system devices (e.g., AP 16, PIP 30, asset tag 18a, reference tag 18b, and/or gateway tag 18c). Hereinafter, unless specified, tag unit 18 will refer generally to tags, which may include asset tag 18a, reference tag 18b and gateway tag 18c.

In an exemplary embodiment, tag unit 18 determines delivery location of the packet to positioning service 14 by performing an address resolution protocol (ARP) frame with the server's destination IP address and a broadcast media access control (MAC) address. A switch forwards this broadcast to all ports, including one attached to a router. A router, recognizing that it can reach the server's network, will send an ARP response frame with its own MAC address as a destination MAC address tag unit 18 can use. Association with PIP 30 is not necessary. Tag unit 18 is able to distinguish between PIP 30 and standard AP 16 by the organizational unique identifier (OUI) at the header of the MAC address.

Tag unit 18 may be a complete, self powered electronic assembly consisting of a printed circuit board, an 802.11 radio MAC/Baseband, 2.4 GHz antenna for transmitting and receiving, and a lithium battery, sealed in a plastic housing.

In an exemplary embodiment, a battery powering tag unit 18 is designed to have a shelf life of 5 years and maintain power up to 3 years once initialized. Tag unit 18 employs an on-board motion detector and low power management system to extend or maximize battery life. Should tag unit 18 become stationary, the battery powers down, hence extending battery life. Tag unit 18 can transmit low-battery alerts when replacement is eminent.

Additionally, reference tags 18b and gateway tags 18c can also synchronize with each other and asset tag 18a to conserve battery life. In one embodiment, the first reference tag to be activated may send a pulse signal on a periodic interval. Other reference and gateway tags that become active will detect the pulse and begin sending their signals just slightly offset from the pulse. When asset tag 18a wakes up, it waits for a signal and then stays awake just long enough to receive all the signals from the reference and/or gateway tags. Asset tag 18a may be configured to then awake at the same periodic interval as the reference tags and gateway tags, thereby maximizing it sleeping time and conserving battery life. In one embodiment, asset tag 18a wakes up when it detects motion. After waking up from motion detection, it waits for a signal and then stays awake just long enough to receive all the signals from the reference and/or gateway tags.

In an exemplary embodiment, tag units 18 are software configurable so that any single tag unit may be configured or reconfigured to act as either an asset tag, a reference tag or a gateway tag. Software configurable tag units 18 provide maximum flexibility for adapting to new coverage areas and new coverage area configurations.

In an exemplary embodiment, the physical size of tag unit 18 is less than 2" high by 1.5" wide by 1" deep, with a weight of less than one ounce. Tag unit 18 comprises a welded waterproof, chemical-proof case and may be mounted to asset by adhesive, tie wrap, lanyard, or clip. Tag unit 18 withstands temperatures from 0 to 120 degrees Fahrenheit and non-condensing humidity from 0 to 95%. Tag unit 18 is IEEE 802.11b and FCC compliant, and is capable of both high frequency (2.4 GHz) and low frequency (262 kHz) transmission. However, all tags do not necessarily have to come in the same physical form factor. Various tag units 18 may be different shapes, sizes and enclosures and they may be powered externally or battery powered. Tag units 18 may accept different battery types, or be rechargeable and have a docking station designed for battery recharging.

In an exemplary embodiment, tag unit 18 includes a tamper detection security feature, tamper contacts, that prevents theft and loss of equipment by causing an alert when tag unit 18 is removed from the asset or other fixed location (depending on the tag type). The contacts are connected to an adhesive pad that is used to attach tag unit 18 to the asset or fixed location. When tag unit 18 is removed from the asset or fixed location, the contacts in the adhesive pad break and come free from tag unit 18 and a tamper is detected. U.S. Pat. No. 7,098,792 assigned to the assignee of the present application is herein incorporated in its entirety by reference and discloses tamper proof features.

Figure 3:
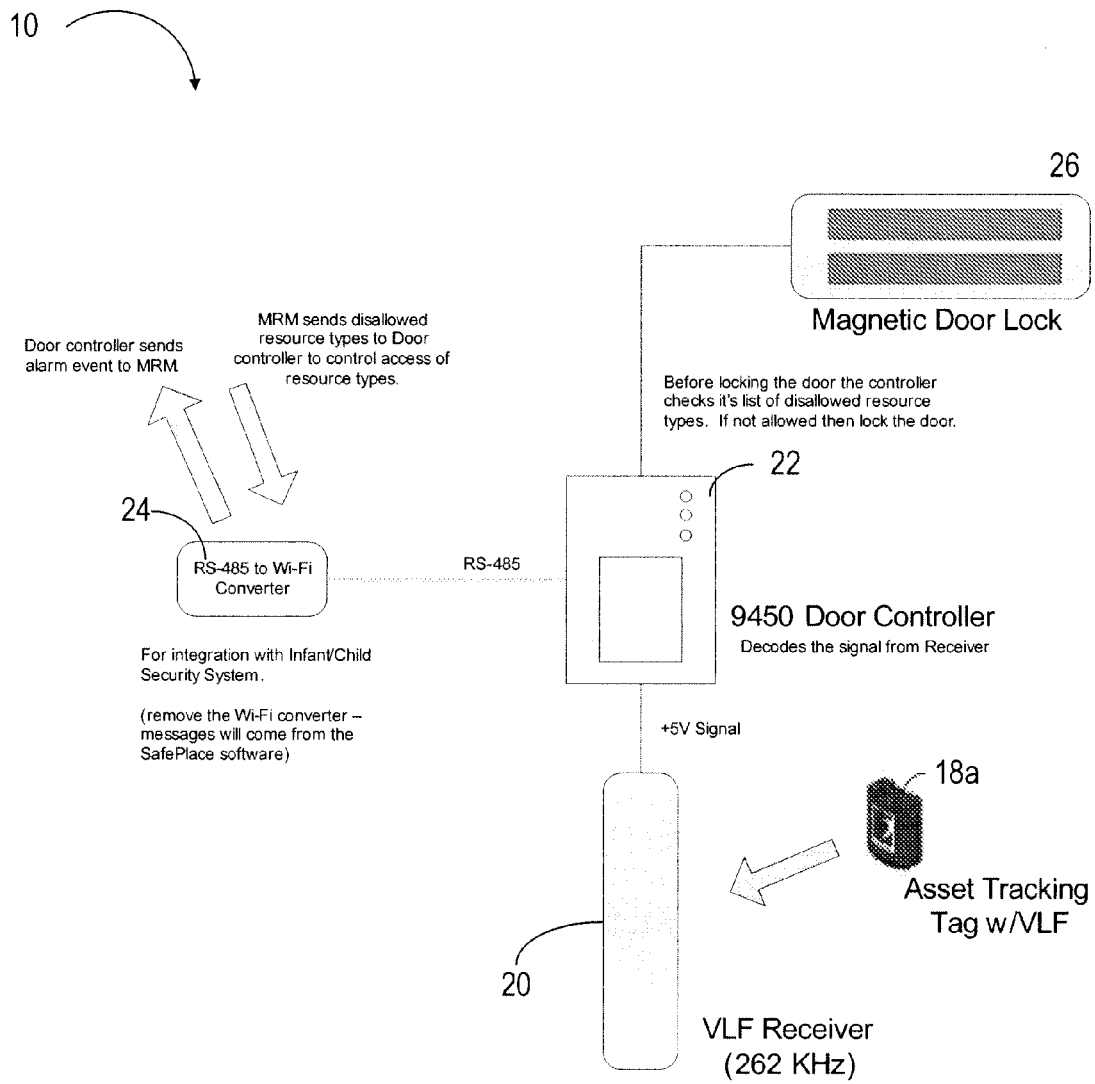
FIG. 3 is a flow diagram of a security feature utilizing a low frequency proximity sensor for use in the asset tracking system illustrated in FIG. 1 according to another exemplary embodiment.

In an exemplary embodiment illustrated in FIG. 3, asset tag 18a incorporates low frequency transmitter 20 that can be configured to stop equipment or people from leaving the facility or area of the facility. The low frequency ID is programmed into asset tag 18a during initial configuration at the facility. Tag configuration software selects the next unused low frequency ID and associates with the MAC ID of tag unit 18. The low frequency transmitter may incorporate unique low frequency ID's in order to use the receive data from portal receivers to determine asset tag 18a floor to floor movement.

The movements can be used by the positioning algorithms to place asset tag 18a on the proper floor.

In an exemplary embodiment, tag configuration software is used to provide a means of updating tag unit 18 configuration parameters in the facility over a wireless network. Tag unit 18 is shipped with a default service set identifier (SSID). Once the tamper contacts are shorted, tag unit 18 associates to the AP with the default SSID begins looking for a server packet from AP 16 containing new configuration parameters. If a server packet is not recognized within a designated time frame, tag unit 18 goes back into low power sleep mode. AP 16 or PIP 30 with an SSID connected to a laptop or PC with administrative software can be utilized to perform the initial configuration. Embodiments of PIP 30 are discussed with reference to the FIGURES.

Once activated, tag unit 18 can also be configured through a wireless network. Upon doing a collection, tag unit 18 listens for a server packet that is directed to its own MAC address. When a server packet is received by tag unit 18, tag unit 18 updates its internal parameters and sends an acknowledgement during its next positioning transmission.

As illustrated in FIG. 3, a very low frequency (VLF) 262 kHz proximity sensor 20 is attached to a high frequency wireless enabled door controller 22. U.S. Pat. No. 5,793,290 discloses a door controller and is incorporated herein by reference in its entirety and assigned to the assignee of the present application.

Magnetic door locks are often used in conjunction with asset tag 18a as a security system for monitoring the movement of persons in secured areas. The security system is based on a combination of a dual transmitting asset tag 18a attached to an asset and a plurality of receivers appropriately located within secured areas. Proximity sensor 20 receives the VLF 262 kHz security and proximity signal transmitted from asset tag 18a when it comes within range of proximity sensor 20. Information contained in the low frequency signals is communicated by door controller 22 to positioning service 14 and is used to improve the precision of the location algorithms and to enhance the overall security of asset tracking system 10. When asset tag 18a is sensed by proximity sensor 20, information is sent to positioning service 14. Given the VLF range is very defined and finite, a proximity message received for asset tag 18a is given the highest priority in terms of location delivered to the user. The location accuracy of asset tag 18a is improved due to a limited communication range of the VLF signal.

When a low frequency reader detects a presence of asset tag 18a, asset tracking system 10 can lock a door. A message is sent from door controller 22 to a mobile resource manager via an RS-485 to wireless converter 24. The mobile resource manager sends disallowed resource types to door controller 22 so as to control access of resource types. Before locking a door, door controller 22 checks the list of disallowed resource types provided by the mobile resource manager. If a resource type is not allowed, magnetic door lock 26 locks a door. Door controller 22 sends an alarm event to the mobile resource manager as necessary. This operation increases the security capability on the premises and improves wander management and security capabilities of asset tracking system 10.

VLF proximity sensor 20 can support a unique 16-bit tag identifier. VLF transmitters are used for portal security and improved proximity location as they must be read from within a very defined, repeatable, and consistent distance of 4 to 8 feet. This distance is desired for portal security and improved proximity location. Higher frequency signals for portal security and proximity location become less desirable as they are more subject to interference and are less consistent in read range accuracy.

Figure 4:
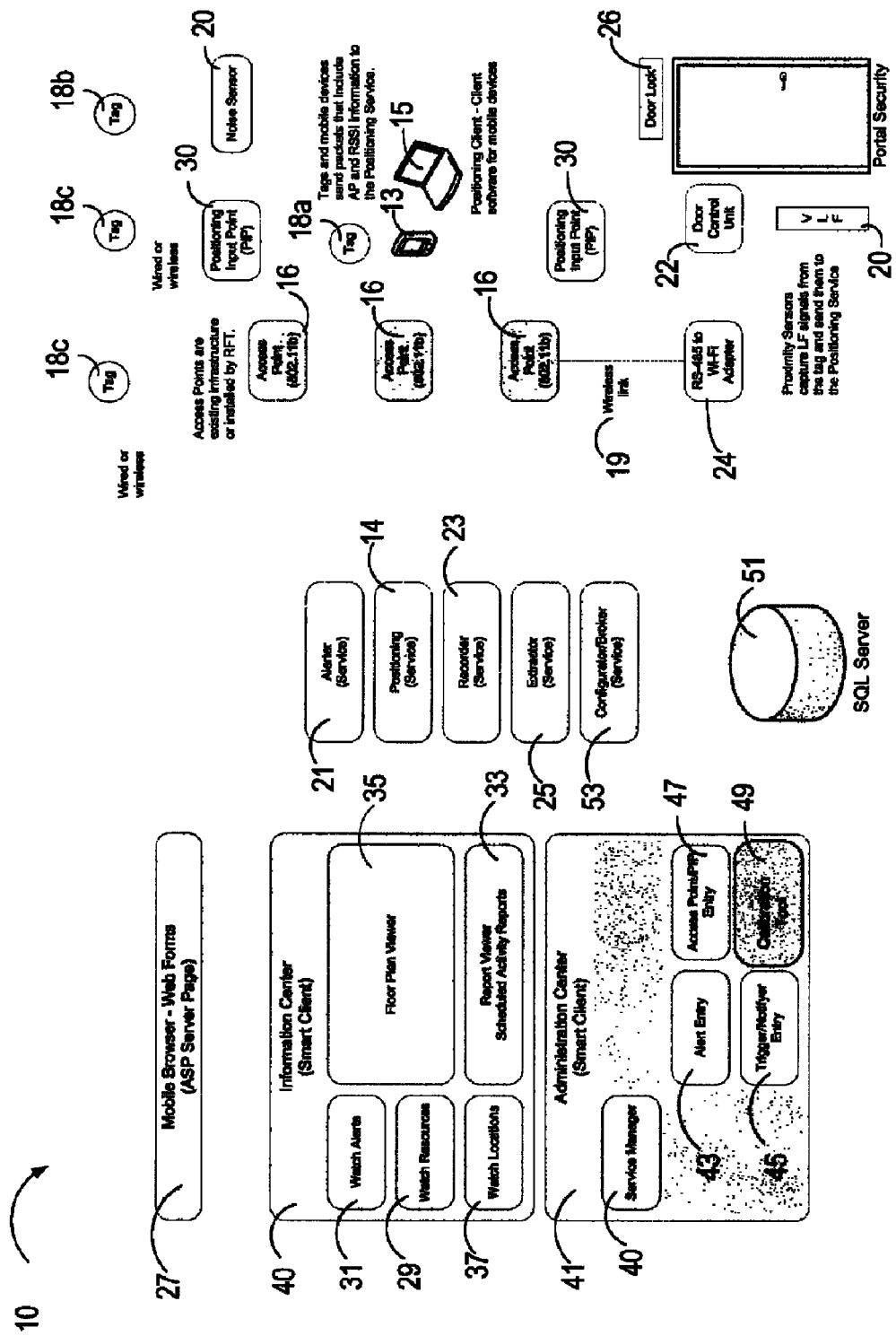
FIG. 4 is a block diagram of an overview of an asset tracking system according to another exemplary embodiment.

In an exemplary embodiment, as illustrated in FIG. 4, a positioning input point (PIP) 30 is an optional component to asset tracking system 10. Many installations with existing 802.11 networks 19 may not have adequate AP 16 locations or coverage to obtain the desired location accuracy. PIP 30 is used to improve positioning performance and to extend the communication coverage tag unit 18 where existing wireless coverage is intermittent or inadequate. PIP 30 can be configured to broadcast 802.11b compliant beacons to be used by tag unit 18 to improve performance by providing additional RSSI measurements. Alternatively, PIP 30 can also be configured to transmit other types of beacons. As mentioned above, other tag types, such as reference tag 18b and gateway tag 18c may be employed to extend communication coverage or enhance reliability in the current coverage area.

PIP 30 can also connect as a client station to an existing 802.11b wireless network to provide a wireless backhaul to an existing 802.11b network when a wired Ethernet connection is not needed. PIP 30 is not a fully functional 802.11b access point 16 in that it does not allow other 802.11 devices to associate. Consequently, PIP 30 does not relay any data or communications other than tag unit 18 information. PIP 30 monitors for tag unit 18 association requests when not transmitting to look for tag unit 18 position updates. PIP 30 sends out an association response, which notifies tag unit 18 of the association ID and returns back to receive mode to collect the new tag unit 18 position update.

In an exemplary embodiment, PIP 30 is a complete AC or POE powered electronic assembly consisting of a printed circuit board, 802.11 radio, MAC/Baseband, and a 2.4 GHz antenna 32 for transmit and receive, in a plastic housing.

In an exemplary embodiment, PIP 30 can operate in a promiscuous PIP mode. PIPs 30 are used in the asset tracking system to provide additional signal sources in asset tracking systems that do not have adequate access point 16 coverage for location based systems. PIPs 30 are also used to improve the location accuracy in areas that need further distinction due to the AP 16 layout or other factors.

PIP 30 in promiscuous mode in an asset tracking system can have the ability to be used in commissioning or debugging of the asset tracking system. PIP 30 in promiscuous mode is in continuous receive mode and does not restrict packets into classes. It is essentially a wireless packet sniffer that allows debugging of all packets present in the medium. Packets seen by PIP 30 are not only devices that are part of the asset tracking system but all packets present in the medium. PIP 30 in promiscuous mode can also be used to flag the software of tag units 18 that are not behaving accordingly on the network for debugging purposes.

A PIP 30 in promiscuous mode can monitor packets from other wireless devices such that PIP 30 can provide RSSI values from various packets of other wireless devices. PIP 30 can send MAC address of wireless devices along with RSSI values from the various packets seen to the location server. This allows for tracking of other devices without needing to load an asset tracking wireless client onto devices such as laptops, VoIP phones, PDA's, etc. The software can also be configured to provide a feature of auto-enrolling all MAC addresses seen by PIP 30 to aid in entering all devices onto the location system.

In an exemplary embodiment, PIP 30, reference tag 18b and gateway tag 18c can provide the ability to obtain major power saving modes for asset tag 18a in a system. Asset tag 18a can be configured to collect RSSI from all PIP 30, reference tag 18b, gateway tag 18c and AP 16 in the vicinity of asset tag 18a as in normal operation. In normal operation, asset tag 18a probes all PIPs 30, reference tags 18b, gateway tags 18c and APs 16 and associates to the strongest PIP 30, reference tag 18b, gateway tag 18c or AP 16 from the probes performed. Asset tag 18a can perform ARP to determine the necessary destination MAC address to deliver the location packet to the location engine/server. However, if PIP 30, reference tags 18b, gateway tags 18c and AP 16 are seen, the asset tag 18a can be configured to force the delivery of the location packet through the PIP 30, reference tags 18b, gateway tags 18c and not the AP 16. Since PIP 30, reference tags 18b and gateway tags 18c can perform the ARP for asset tag 18a and since PIP 30, reference tags 18b and gateway tags 18c can allow asset tag 18a the ability to not force an association for tags, there is significant power savings for the tag. The tag knows a PIP is present if it receives a probe response from an OUI.

In another exemplary embodiment, as illustrated in FIG. 4, gateway tag 18c may be configured to connect to positioning service 14 through either a wired or wireless connection. Alternatively, gateway tag 18c may be configured to connect to AP 16 through a wired or wireless connection for communicating packet information to positioning service 14. Reference tags 18b are configured to communicate with asset tag 18a for the generation of RSSI information and the transmission of RSSI information to positioning service 14. The transmission of RSSI information from reference tag 18b to positioning service 14 may be accomplished via gateway tag 18c and/or AP 16. It is important to note that the tags are capable of being configured and reconfigured. Thus, any of the tag types may be reconfigured to perform the functions of the other tag types. For example, reference tag 18b and gateway tag 18c may be configured, or reconfigured, to perform the same functions as asset tag 18a In an exemplary embodiment, implementing Circular Polarized (CP) antennas in the PIP provides significant improvements in RSSI stability in harsh environments. RSSI values can change significantly due to multi-path, orientation, polarization, fading, and other environmental factors. Signals from linear polarized antennas can vary significantly due to the factors listed above.

In an exemplary embodiment, PIP uses directional circular polarized antennas to improve the location accuracy. The use of directional antennas provides significant improvements to the accuracy of the location algorithm by the simple fact that it gives you a better idea of where the tag is located.

In an exemplary embodiment, PIP 30 is recognized as a client on a network. As tag unit 18 communicates with PIP 30, PIP 30 transfers the position information of tag unit 18 to a network. PIP 30 can accomplish this by Ethernet connection or a wireless connection to local AP 16. Therefore tag unit 18 is not in constant communication with the wireless network. This configuration provides power savings for the battery in tag unit 18.

In an exemplary embodiment, PIP 30 can be built into a wireless pull-cord, smoke alarm, etc. for room level accuracy. PIP 30 with a low frequency at bedside for improved location accuracy can aid the facility in customer charges. For example, a hospital knows the exact IV pump and other equipment is situated at what bed location and for what length of time for billing purposes.

Figure 5:
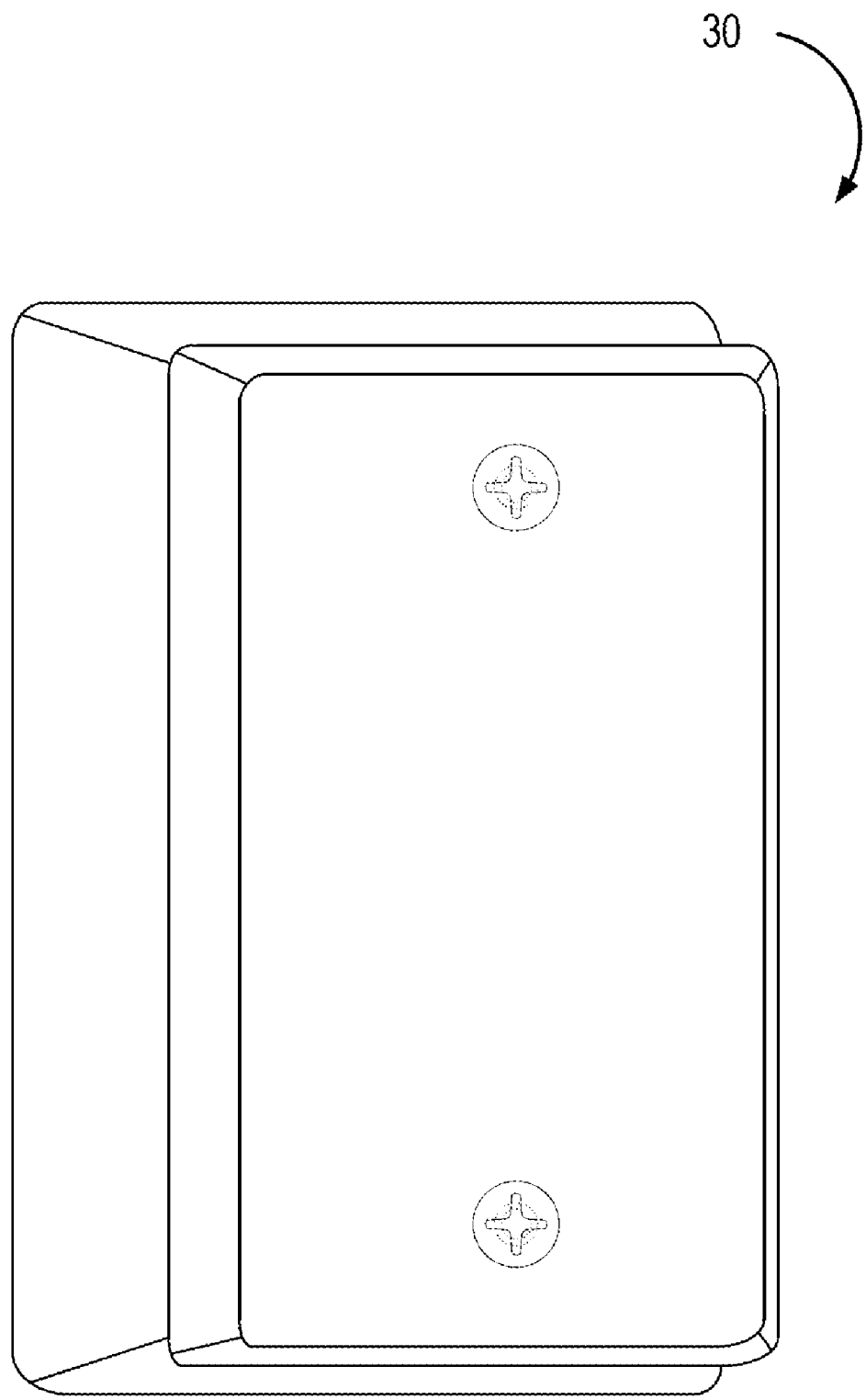
FIG. 5 is a front view of a positioning input point for use in an asset tracking system as illustrated in FIG. 1 according to another exemplary embodiment.

In an exemplary embodiment, PIP 30 has status LED indicators (e.g. LED 34, 36, 38). A power LED 34 of solid red indicates AC or POE power present. A wireless link LED 36 shows a link is present via wireless 802.11 network 19 (illustrated in FIG. 1) to service engine. Solid green indicates a wireless link is established. Flashing green indicates an asset packet was received via a wireless link. Ethernet link LED 38 shows a link is present via Ethernet to a service engine. Solid yellow indicates an Ethernet link is established and flashing yellow indicates an asset packet was received via Ethernet link. An exemplary embodiment of a PIP 30 is illustrated in FIG. 5.

In an exemplary embodiment, built into the circuitry of PIP 30, is the ability to sense noise in the 2.4 GHz spectrum. 802.11 wireless network 19 is divided into eleven channels within the United States. PIP 30 looks at all eleven channels and senses any obstruction in the form of noise that may interfere with asset tracking system 10 or other equipment located within the facility. Positioning service 14 relays this information to user 11. A third party with monitoring ability can be used to incorporate a preventative maintenance program for asset tracking system 10 and related components.

In an exemplary embodiment, as illustrated in FIG. 4, positioning service 14 contains algorithms that determine the position of tag unit 18. Positioning service 14 receives messages from tag unit 18 containing the RSSI values of the AP 16 in an area. Higher RSSI values correspond to stronger signals. Statistical and heuristic algorithms are applied to data and a position of tag unit 18 is determined and published to user 11. Algorithm concepts that are included in an analysis can be the following or any combination thereof: histograms; static analysis; vector analysis; and geometric center analysis. Alternatively, tag unit 18 is configured to apply algorithms to determine its own position (e.g., self locate). In one embodiment, tag unit 18 transmits its location, which is eventually delivered to one or more of: positioning service 14, alerter service 21, recorder service 23, extractor service 25, configurator service 53 and SQL server 51. Once the one or more services are performed, the location of tag unit 18 is delivered to information center 40. Alternatively, the location of tag unit 18 may bypass the various services and be delivered directly to information center 40.

In an exemplary embodiment, alerter service 21 can receive location messages from positioning service 14 and analyze them against alert rules. The rules can be defined, stating when an alert should occur, based on tag unit 18 and location combinations. Rules can be created using administrator center 41.

In an exemplary embodiment, recorder service 23 can subscribe to alerter service 21 and positioning service 14. Recorder service 23 can save changes in data received to an SQL server 51. Data can only be recorded when changes occur.

In an exemplary embodiment, configurator service 53 can provide services, hardware, and applications with necessary configuration information stored in a central database. Configurator service 53 can create initial communication settings to allow services and clients to communicate. Configurator service 53 can also allow scalability for asset tracking system 10 by brokering information requests. Configurator service 53 can also provide interfaces for connecting to a database and retrieving information.

In an exemplary embodiment, extractor service 25 can be queried to retrieve data recorded by recorder service 23. Data can be used by information center 40 and PC/Mobile Web-Forms 27 to provide tracking functions and generate custom reports.

In an exemplary embodiment, information center 40 is a user interface for asset tracking system 10. Information center 40 can watch resources 29, watch alerts 31, view reports, 33, create utilization charts, view floor plans, 35, and monitor real-time data pertaining locations 37.

In an exemplary embodiment, administrator center 41, can be a primary user interface for configuring data into asset tracking system 10. Administrator center 41 consists of several modules that allow users tag unit entry 39, alert entry 43, trigger entry 45, resource entry, location entry, access point entry 47, etc. Administrator center can also be a primary tool used for calibration 49.

Information center 40 and positioning service 14 may be incorporated into one station, such as a PC or server, or a configuration of multiple PCs or servers. The station incorporating information center 40 and positioning service 14 may be remotely located with respect to the coverage area or may be on site. Information center 40 and positioning service 14 may be separate stations and either one may be remotely located with respect to the coverage area or located on site. The other services (e.g., alerter service 21, recorder service 23, extractor service 25, and configurator service 53) and SQL server 51 may be incorporated into a single station with the information center 40 or may form one or more stations at one or more locations in various configurations.

It is important to note that while the discussion of FIGS. 6-49 below generally refers to access point (AP) 16, other types of transmitting points may substituted, including PIP 30, reference tag 18b and gateway tag 18c. Additionally, if asset tag 18a is configured to self locate, it may utilize the algorithms and functions below to determine its own location with respect to the various reference points in the coverage area (e.g., AP 16, PIP 30, reference tag 18b or gateway tag 18c). Furthermore, the discussion below describes the use of sample calibration points by a processing station for calculating the various location of the reference points (e.g., AP 16, PIP 30, reference tag 18b or gateway tag 18c) and asset tag 18a, however, processing station can use dynamic sample points obtained from reference points and asset tags for location calculation.

When a positioning project is begun, the first step is to collect calibration data at given locations. One calibration data file is a set of a number of RSSI samples. The recommended number, N, is 2000; 500 or 20 being acceptable for a rapid test.

Figure 10:
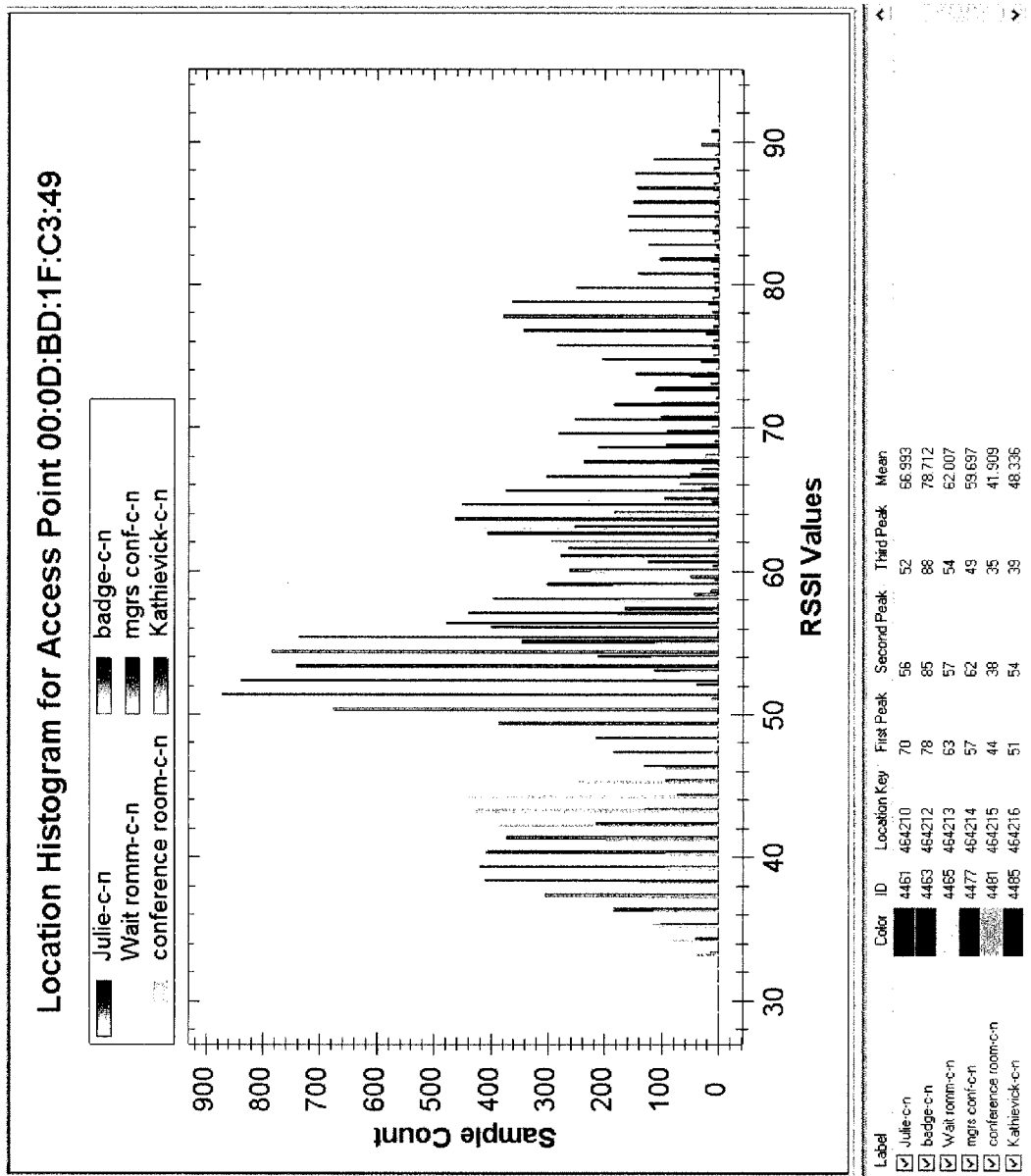
FIG. 10 is a graph of a histogram, used as an example, according to another exemplary embodiment.

Histograms can be created from calibration data. The histogram, as illustrated in FIG. 10, is a graph of a probability distribution function vs. the RSSI value. For instance, in a given calibration data file, the minimum RSSI value is 25, and the maximum RSSI value is 75. This calibration data is within the range of (25,75). As an example, in 2000 samples; there are 1600 samples with an RSSI value of 50, 130 with an RSSI value of 60, 100 samples with an RSSI value of 55. Mode is the term used for an RSSI value with the highest number of samples, or the highest probability. Here, the RSSI value of 50 is the mode. The histogram can be treated as an N dimensional vector. Any RSSI value in the range of (25,75) is possible with the mode value as the highest probability.

Once calibration data collection is done in all locations, the next step is to take test samples. The function of a positioning algorithm is to find likelihood between the testing sample and all calibration histograms. Because a histogram is a graph of the probability distribution function vs. the RSSI value, or a range of energy, it is required to take M number samples. The M number, or testing samples, can be treated as an M dimensional vector, a sub vector of a calibration histogram vectors. Generally, M is much less than N. (A preferred M value is 15 or 20.)

If in a given positioning environment, there are number of J locations and number of K Access Points, then in a normalized histogram:

$$H_{jk}, j=1, \ldots, J, k=1, \ldots K$$

will provide a J×K matrix, or a J×K dimensional vector space. The definition of normalized histogram is:

$$\sum_{i=min}^{max} P_i(RSSI) = 1.$$

Therefore:

$$P(50)=0.8, P(55)=0.05, \text{ and } P(60)=0.065$$

The calibration normalized histogram is a set of probabilities:

$$H_{jk}=\{P_i(RSSI)|i=\min, \ldots, \max\}$$

If a testing sample contains:

$$\{60,55,50,50,50\},$$

then the test vector components become:

$$V(50)=3, V(55)=1, V(60)=1,$$

then the inter product of these two vectors is:

$$P(50) \cdot V(50)+P(55) \cdot V(55)+P(60) \cdot P(60)=2.4+0.05+0.065=2.515.$$

After finding inter products with all location calibration vectors, the top two locations with the highest inter product values are the output of the vector algorithm. In an exemplary embodiment, the first step in the analysis is to define RSSI. The RSSI is related to the value of the amount of energy present in the dBm (dB milliwatts) scale. The mathematical definition of RSSI:

$$RSSI(x) = 10\log_{10}\left(\frac{I(x)}{I(0)}\right) \quad (1)$$

Figure 6:
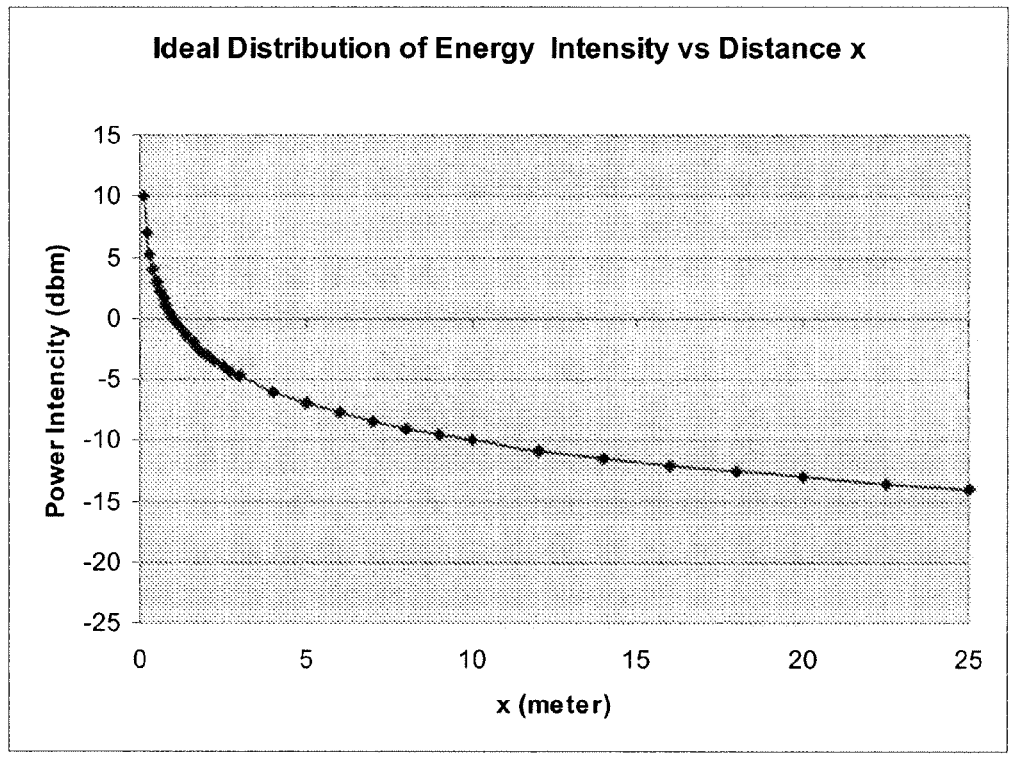
FIG. 6 is a graph of energy distribution vs. distance according to another exemplary embodiment.

RSSI(x) is the value measured by PDA 13 or other wireless devices. It is a function of distance x, where I(x) is the amount of energy at position x, and I(0) is the amount of energy at position 0, the source of the energy. FIG. 6 illustrates energy distribution vs. distance.

The amount of energy is proportional to the reciprocal of $x^2$, and I(0) is a constant of AP 16:

$$I(x) \propto \frac{1}{x^2} \quad (2)$$

$$RSSI(x)=-20 \log_{10} x - A \quad (3)$$

$$RSSI(x) = -20\frac{\ln x}{\ln 10} - A \quad (4)$$

Figure 7:
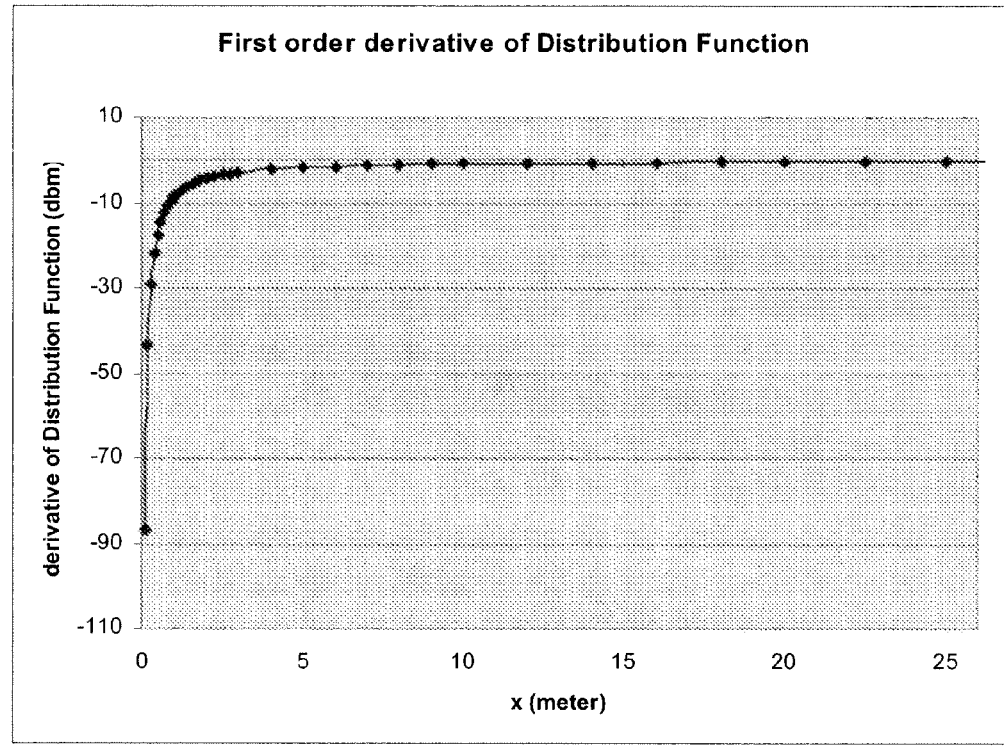
FIG. 7 is a first order derivative of the distribution function illustrated in FIG. 6 according to another exemplary embodiment.

Then, the derivative of RSSI(x) as illustrated in FIG. 7:

$$\frac{d(RSSI(x))}{dx} = \left(-20 \cdot \frac{\ln x}{\ln 10} - A\right) = -\frac{20}{\ln 10} \cdot \frac{1}{x} \quad (5)$$

Therefore, $$-\frac{\Delta(RSSI(x))}{\Delta x} \propto \frac{1}{x}, \quad (6)$$

Figure 8:
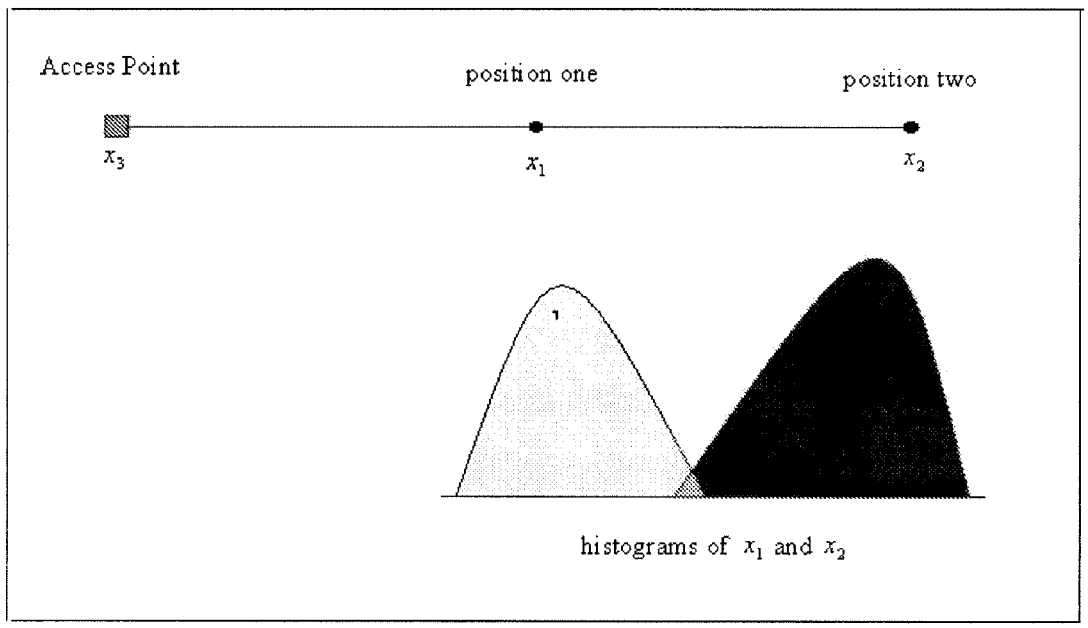
FIGS. 8 and 9 are histograms that represent geometric analysis of an access point for use in an asset tracking system as illustrated in FIG. 1 according to another exemplary embodiment.

Consider the most simple case (see FIG. 8). An AP lines up with two positions at $x_1$ and $x_2$.
If $\Delta RSSI(x)=-5$, and $x_2-x_1=\Delta x=3$, then the estimated distance between AP 16 and the tag unit 18 is:

$$x \approx -\frac{\Delta x}{\Delta RSSI(x)} \cdot \frac{20}{\ln 10} = 5.2. \quad (7)$$

This result is the effective radius of AP 16, or x, is approximately 5 meters when the difference between the RSSI(x) values is about 5 dBm between the two locations and the distance between these two locations is about 3 meters.

In an exemplary embodiment, the next step of the analysis is to define the roles of AP 16 and tag unit 18. With reference to a 802.11 wireless network environment, the signal generator, AP 16, transmits a microwave signal with a frequency band of 2.4 GHz. The signal receiver, tag unit 18 or end user device, receives the microwave signal. The strength of the signal is varied by the distance that the signal travels to the receiver. Therefore, the smaller the distance between AP 16 and tag unit 18, the stronger the signal that the tag unit 18 receives.

Approximately 20 to 500 calibration readings can be taken from one location with different antenna orientations. Other quantities of readings can be taken. More than five AP 16 may see tag unit 18 at the location. The RSSI vs. the probability density is graphed in histograms. The histograms are used to fingerprint tag unit 18 locations.

Figure 9:
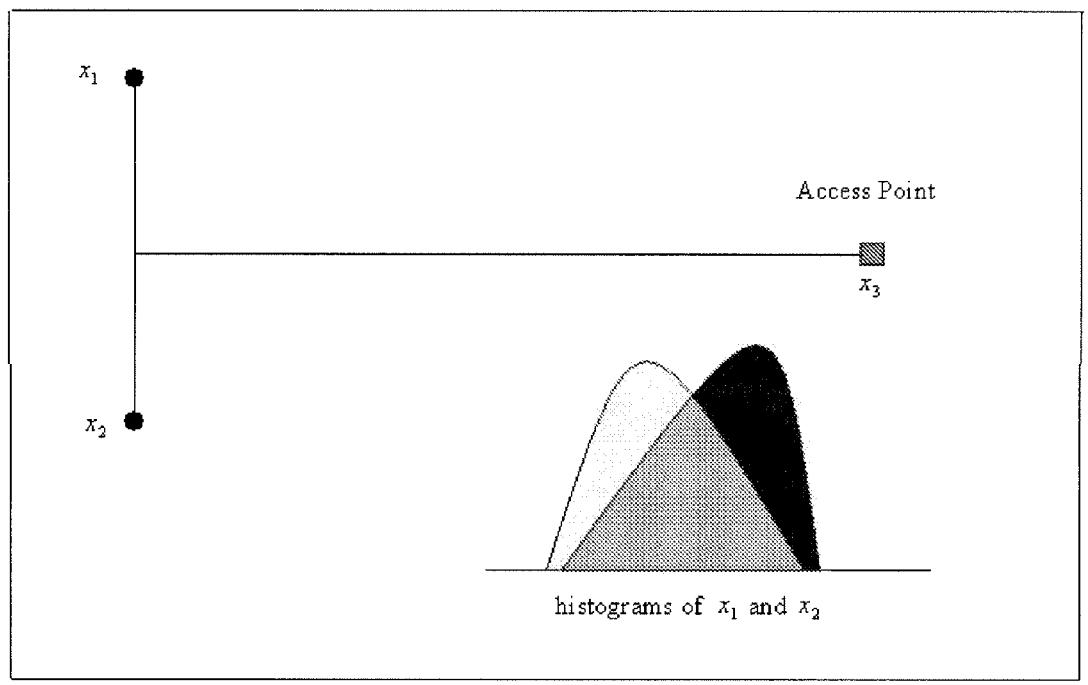

In an exemplary embodiment, as illustrated in FIG. 8, the geometric set up of AP 16 is analyzed. Assume position one is located at $x_1$, and position two is located at $x_2$. AP 16 is located on a line that extends from $x_1$ and x, to $x_3$. Equation (8) determined that AP 16 is approximately five meters away from the middle point of the two positions. Therefore, AP 16 can provide calibration and histogram data to distinguish these two positions within the three meter range. However, should AP 16 be located on a perpendicular bisector line of $x_1$ and $x_2$, as illustrated in FIG. 9, then AP 16 cannot provide any distinguishable information about position one, or $x_1$, and position two, or $x_2$.

Therefore, AP 16 should not be placed symmetrical to target positions. In a facility, the location of AP 16 may not be able to be determined, but AP 16 that is symmetrical to some positions may be filtered out as a potential location. PIP 30 may be added to further determine the location.

In an exemplary embodiment, the required number of access points 16 to locate tag unit 18 becomes:

$$NumberOfAPs \approx \frac{AreaOfBuilding}{EffectiveAreaOfAP} \quad (8)$$

where, $$EffectiveAreaOfAP = \pi \times (EffectiveRadiusOfAP)^2. \quad (9)$$

In an office environment, the recommended Effective Radius is less than 10 meters.

In an exemplary embodiment, a general positioning algorithm is analyzed. In a positioning experiment, more than five, or a set, of access points 16 may see tag unit 18. During a calibration cycle, every access point 16 takes a fingerprint (histogram) of this location. At another location, another set of access points 16 may see tag unit 18. The fingerprint or histogram may be different in both cases. The two sets of access points 16 may have a common sub set that contain the same access points 16, or they may contain different access points 16.

Assume there are N access points 16, and there are M locations in the positioning experiment. If access point 16 indicates one histogram for each location, then the total number of histograms is N×M. A histogram, as illustrated in FIG. 10, normally contains more than one thousand data points. A target tag unit 18 receives ten testing RSSI data from each access point 16 at each location. The positioning algorithm tries to find the highest number of matches between the testing RSSI data and the calibration histogram data.

After transmitting points (reference tags 18b, gateway tags 18c, AP 16 and PIP 30 are calibrated), they may be configured to continuously or periodically monitor their respective environments. When changes in the environment affect signals being transmitted and received to and from other devices (e.g., other AP 16, PIP 30, reference tags 18b and gateway tags 18c) the affected signal source notifies the processing station, such as positioning service 14, and the algorithms are dynamically adjusted to account for the changes. Changes that might affect signals include, but are not limited to: new objects, structures or barriers within the coverage area, the addition or removal of devices configured to connect with the location system, addition of devices not configured to connect with the location system within the coverage area that transmit signals at frequencies that interfere with the system, changes in weather, etc.

In an exemplary embodiment, the purpose of developing the algorithm is due to limitations contained within the facility. Rooms, doors, windows, walls, equipment, etc. attenuate a radio frequency signal received by tag unit 18. Therefore, the signal is no longer a function of only distance, but the signal's energy distribution within the facility. Tag unit 18 can access one set of access points 16 at one position, another set of access points 16 at another location and, in some positions, tag unit 18 can access the same set of access points 16. Therefore, if a map can be made of access points 16 in the system, then the correct position of tag unit 18 can be determined by comparing the tag unit 18 exemplary set data with access point mapping.

In an exemplary embodiment, an assumption is made that every location has unique access point mapping. The target position of tag unit 18 may then be found. In some cases, tag unit 18 may have the same access point mapping. In these cases PIP 30 may be added to further pinpoint the location.

In an exemplary embodiment, an access point mapping algorithm is created. Access point mapping could be a filter that eliminates locations far away from the target location. Access point mapping is created during system initialization period. As illustrated in FIG. 11, the map is an N×M bit map, where N=11, and M=7. The rows, N, represent locations, and the columns, M, represent access points 16 (AP). The last column is the bitmap values, or vectors, of each location. Each individual AP represents a component of the vector. The order of the component is random.

The target data is collected and an AP vector is generated of the location as illustrated in FIG. 12. The order of the AP in the vector is the same as on the map.

The tag vector is then put into a logical operation, or XOR, at each vector location. If one XOR result has a minimum number of components, then this location is correct. If there are two or more XOR results with a minimum number of components, then it becomes necessary to find the location's access point vector that has the maximum number of components. If only one location of AP vector has the maximum number of components, then this location is correct. If there are multiple locations with the same maximum number of components, then these locations are candidates that need to be analyzed through other algorithms.

Illustrated in FIG. 13, is the result of the tag target AP vector XOR with the coordinating access point mapping vector. There are five components in XOR of location 0, 2, 3, and 4 (0x0689); nine components of XOR of location 1 (0x06b0; three components in XOR of location 5 (0x0284) and location 6 (0x0205). The locations having the minimum number of components in their XOR results could be the target location for tag unit 18. Therefore, the access point mapping vector of location 5 and 6 access point vectors are considered. All other locations are filtered out. There are nine components in the vector of location 5 (0x03fd); and seven components in the vector location 6 (0x037c). Both location 5 and location 6 have three components different from the tag's vector, but location 5 has two components more than location 6. The tag's vector is more similar to with location 5 than location 6. Therefore 5 is determined to be the final location.

FIG. 14 is another testing tag target AP vector (0x07f0). FIG. 15 shows the result of the tag target AO vector XOR with each AP mapping vector. There are zero components in the location 0,2,3, and 4. These four locations have the same AP mapping vector, so they are all candidates for further analysis.

FIG. 16 is another testing tag target AP vector (0x03f9). FIG. 17 shows the result of the tag target AP vector XOR with each AP mapping vector. Only location 5 has one component, therefore location 5 is determined to be the final answer.

In an exemplary embodiment, another phase of data analysis for the calibration testing data, is to verify another type of testing tag data. There are twelve sets of testing data with five data points in each set.

As illustrated previously, in free space, the electromagnetically microwave signals are attenuated in conjunction with $$\frac{1}{r^2}.$$

Therefore, a GPS, in free space, can determine a target position of tag unit 18 successfully by the triangulation with variables of altitude, latitude, longitude, and time. However, in an indoor environment, the microwave performs totally different. Because of multi-path interference, the signals are combined by superposition. Therefore variables must be determined to distinguish one position from others and a model must be established to fit the system.

Initially, there are no rules governing the mapping process according to one embodiment. The only guideline is which zone owns the highest location probability judged by the five AP histograms. The results are then ranked by probabilities of the zones.

Figure 49:
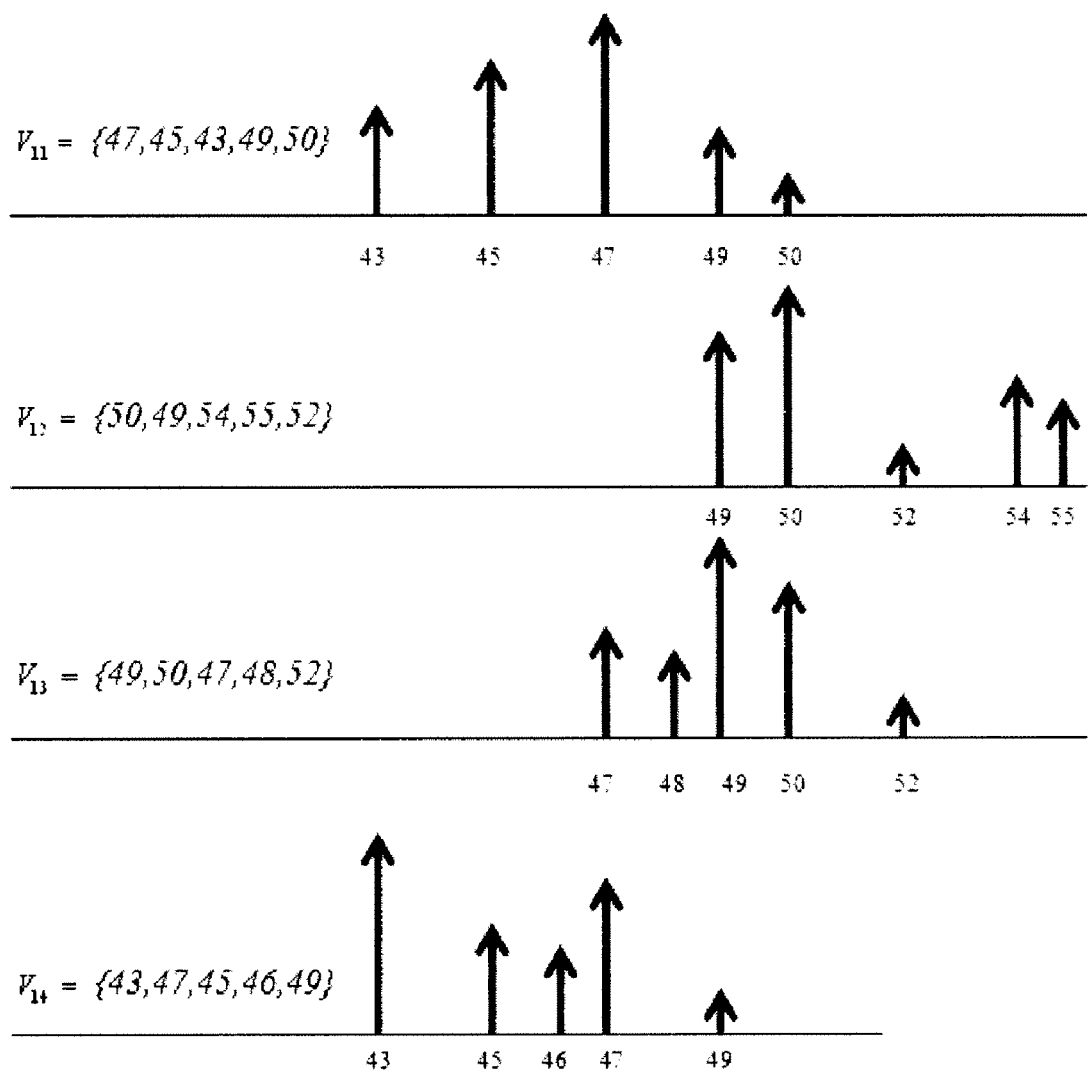
FIG. 49 is an example of a vector analysis used for access point location determination in an asset tracking system according to another exemplary embodiment.

In yet another exemplary embodiment, facility assets can be frequently moved about the facility for use in other areas on an as needed basis. Tag unit 18 can be mounted on each asset. As assets are moved from room to room or floor to floor, wing to wing, etc, different areas of the facility can have varying wireless signal strengths. In order for asset tracking system 10 to locate a tag, a calibration of facility areas is performed. A vector analysis, an example of which is illustrated in FIG. 49, can be used to determine varying signal strengths throughout the facility. A vector analysis can be analyzed to determine a location of tag unit 18. In the example illustrated in FIG. 49, the V designation with subscript is an assigned area within a facility. The area can be a room, wing, zone, etc. As tag unit 18 collects signals within these areas, a number of samples are read from the signals. The vectors represent the signal strength readings taken from the samples. Signal strength readings are then compared with previous samples taken. If a match is made, the asset location is determined. In the example in FIG. 49, five samples have been read. These samples and their corresponding readings are represented by vectors. The first sample 43 received 3 votes as the preferred signal, the second sample 45 received 4 votes as the preferred signal, the third sample 47 received five votes as the preferred signal, the fourth sample 49 received 2 votes as the preferred signal, and the fifth sample 50 received one vote as the preferred signal. Therefore 47, the signal with the highest number of votes translates to the strongest signal and becomes the location of tag unit 18 that is entered into the database.

Once the location of tag unit 18 is determined, it is also recorded in a database for future report generation. In an exemplary embodiment, in a database, all calibrated locations have their coordinates on the map. A positioning display is based on the coordinates of the calibrated locations. Ideally, the probability of the calculated location is greater than 90%. When a location does not return a 90% result, another means can be used to determine a location.

In an exemplary embodiment, a calculated position in a histogram of higher than 90% is determined "in". If the location does not return a 90% probability, then it may be located "between" or "near by" a calculated location. In these situations, the mean coordinate is calculated based on the top three coordinates with locations that return higher than 10% probability.

Therefore, the formula for mean location:

$$\overline{x} = \frac{\sum_i x_i \cdot N_i}{\sum_i N_i} \quad (11)$$

Figures 19, 20:
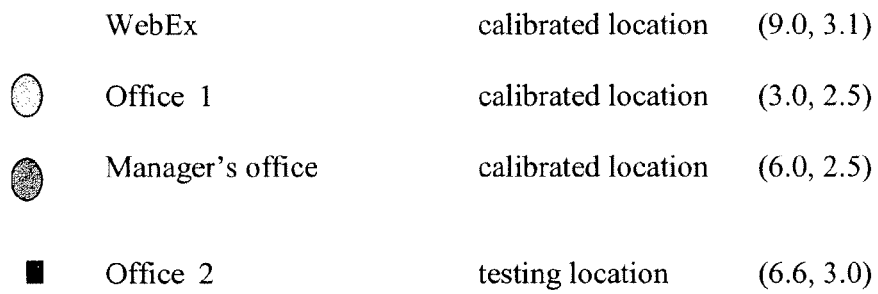
FIG. 19 is a table showing examples of access points being positioned near by or between other access points according to another exemplary embodiment.
FIG. 20 is a graphical representation showing examples of access points being positioned near by or between other access points according to another exemplary embodiment.
Figure 21:
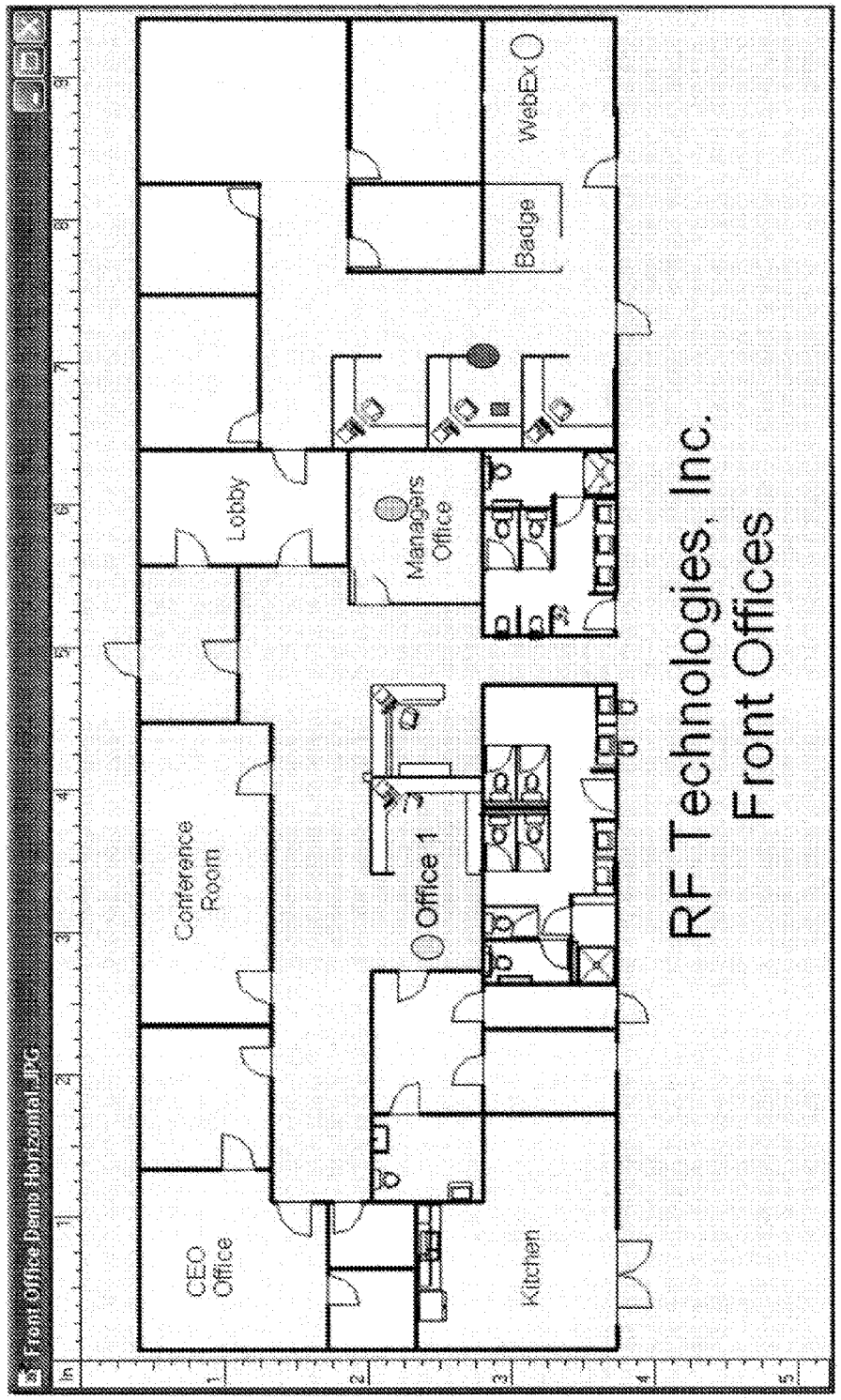
FIG. 21 is a map showing examples of access points being positioned near by or between other access points according to another exemplary embodiment.

In an exemplary embodiment, an example calculation for a "near by" or "between" location is illustrated in FIGS. 19 thru 21. Tag unit 18 is a laptop wireless card with MAC address 00:20:A6:57:FC:F6. The total count of positioning readings is between 20-500 in a preferred embodiment. The distribution of the top three locations vs. the count is illustrated in the table in FIG. 19. The total count of positioning readings is 1000. In FIG. 20, the legend for the office map is illustrated. The coordinates for the top three calibrated locations, WebEx office, Manager's office, and Office 1, are illustrated in FIG. 21. The test was run in Office 2 as illustrated on the map of the front offices, FIG. 21. Inputting the data into equation (11):

$$\overline{x} = \frac{9.0x695 + 3.0x181 + 6.0x40}{1000} = \frac{6255 + 543 + 240}{1000} = 7.038, \text{ and}$$

$$\overline{y} = \frac{3.1x695 + 2.5x181 + 2.5x40}{1000} = \frac{2154.5 + 452.5 + 100}{1000} = 2.707.$$

The calculated mean, or "near by" or "between" location has a coordinate of (7.0, 2.7) and is plotted on a map.

Figure 24:
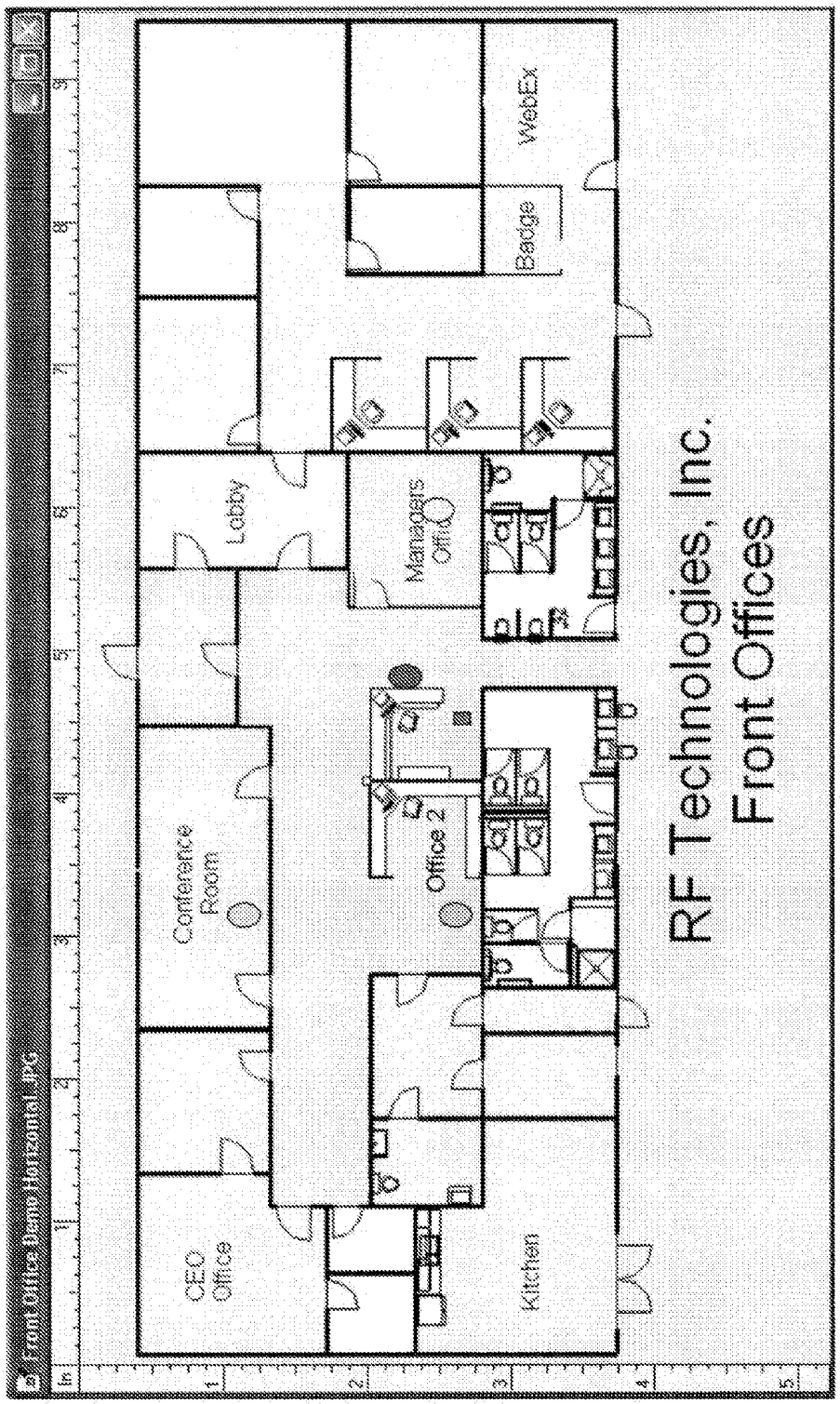
FIG. 24 is a map showing examples of access points being positioned near by or between other access points according to another exemplary embodiment.
Figure 25:
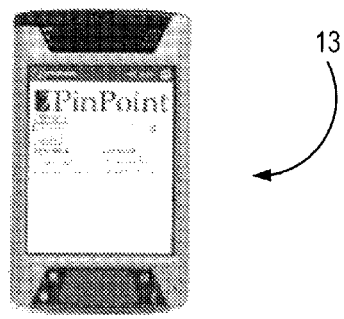
FIG. 25 is the front view of a PDA, an example of a user interface, for use in an asset tracking system illustrated in FIG. 1 according to another exemplary embodiment.

In an exemplary embodiment, the same calculations are used in another example to locate the "near by" or "between" location. In this example, as illustrated in FIGS. 22 thru 24, tag unit 18 is the same laptop wireless card with the same MAC address as in the above example. This time the total count is 500. The distribution of the location vs. count is listed in the table in FIG. 22. In this example, the laptop is sitting in a location where there is no calibration data for that particular spot. The top three locations are then provided in a "near by" range. The actual location of tag unit 18 is in the triangular area created by the three locations. As illustrated in FIG. 23, the top three locations calculated are: Manager's Office, Conference Room, and Office 1. Inputting this data into equation (11):

$$\bar{x} = \frac{6.0x323 + 3.0x112 + 3.0x48}{500} = \frac{1938 + 336 + 144}{500} = 4.836,$$

and $$\bar{y} = \frac{2.5x323 + 1.0x112 + 2.5x48}{500} = \frac{807.5 + 112 + 120}{500} = 2.079.$$

The calculated mean, or "near by" or "between" location has the coordinates (4.8,2.1) and is plotted on the map in FIG. 24.

In an exemplary embodiment, a mobile resource manager software suite can be used to enable users of asset tracking system 10 to configure and manage assets and track their equipment from any Internet enabled PC or PDA 13. The mobile resource manager software suite is a group of client applications, administrative tools, and custom MS Windows® services. The software provides an efficient system for locating assets and analysis of asset utilization based on real-time location. Included within the software suite: information center 40, which provides a single user interface to find resources, view alerts, run reports, create utilization charts, view floor plans, and monitor real-time data pertaining to location and alert states; administrator center 41, which provides a set of utilities that allow users to enroll and configure tag units 18, and to enter resources, locations, alerts, triggers, and e-mail notifications; a search engine, which is a browser-based application that can retrieve a list or map showing resource locations; and a mobile view application, which is a simplified interface designed for web-enabled devices, such as PDA's 13 (illustrated in FIG. 25), smart phones, cell phones, etc.

Figure 26:
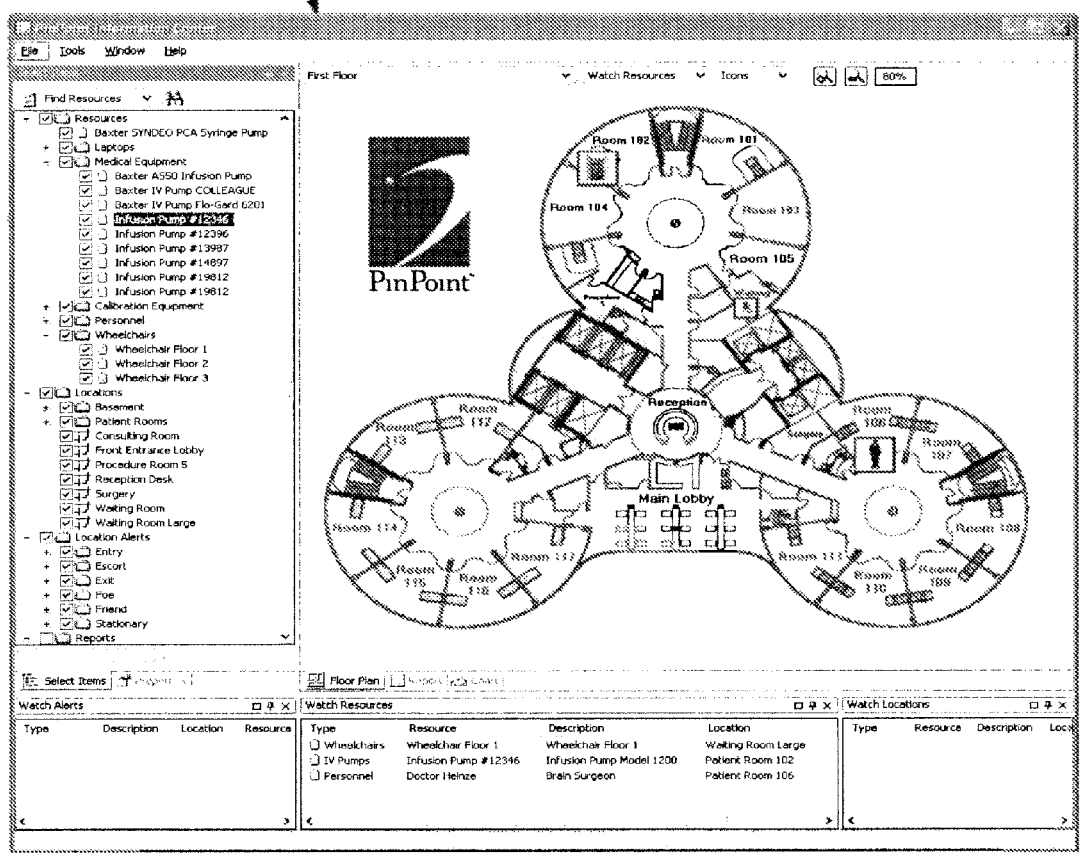
FIG. 26 is a screen shot of an information center for use in an asset tracking system illustrated in FIG. 1 according to another exemplary embodiment.
Figure 27:
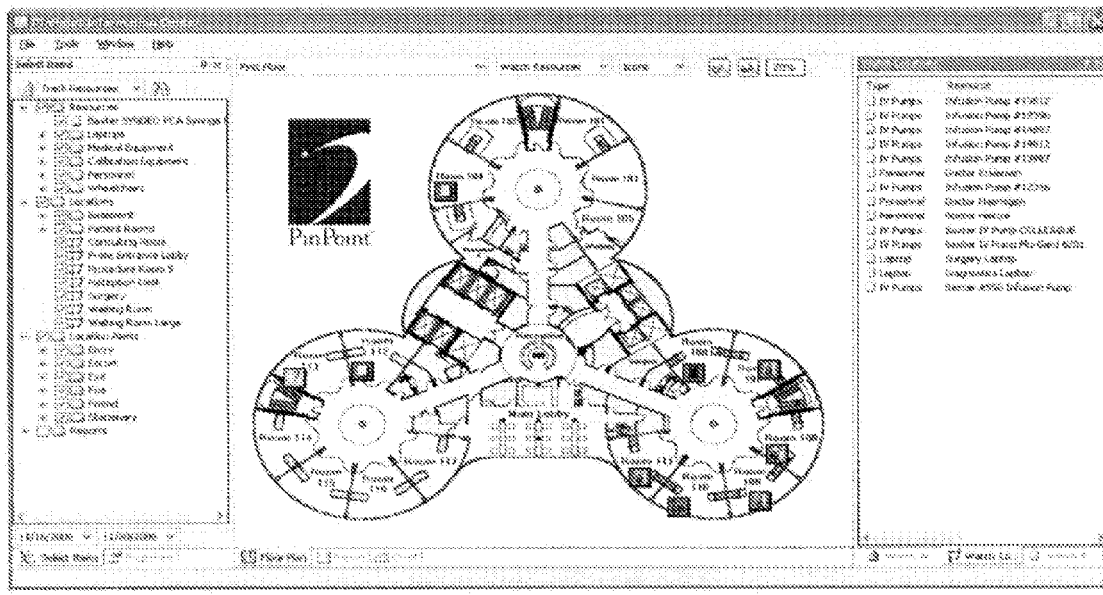
FIGS. 27 thru 29 are examples of title bar configurations as used in an information center illustrated in FIG. 26 according to another exemplary embodiment.
Figure 28:
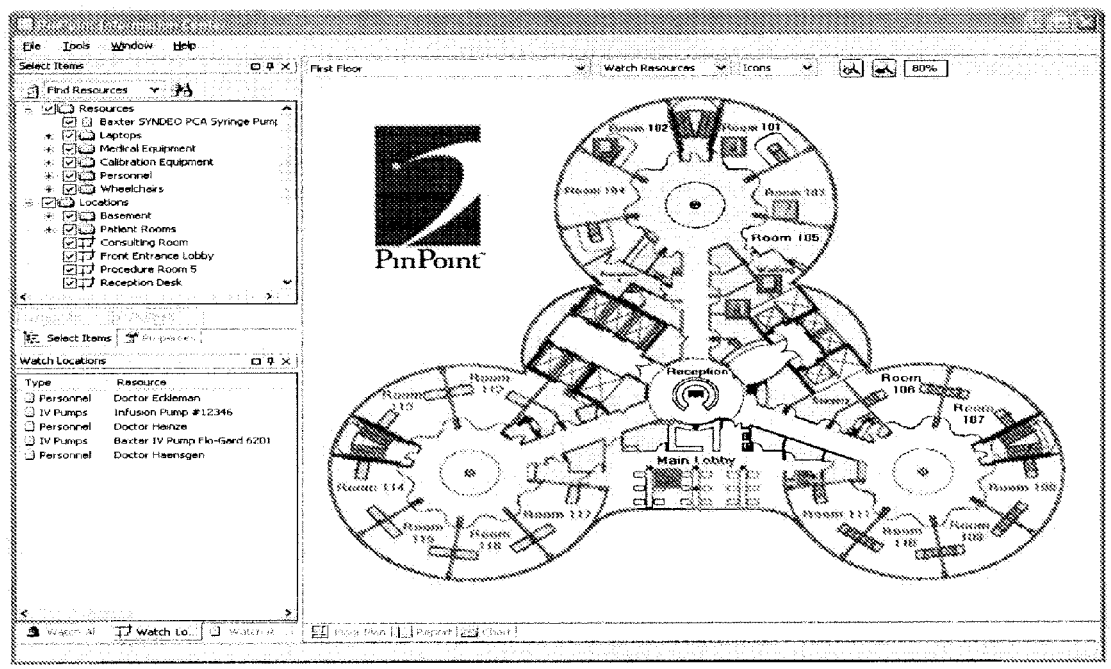
Figure 29:
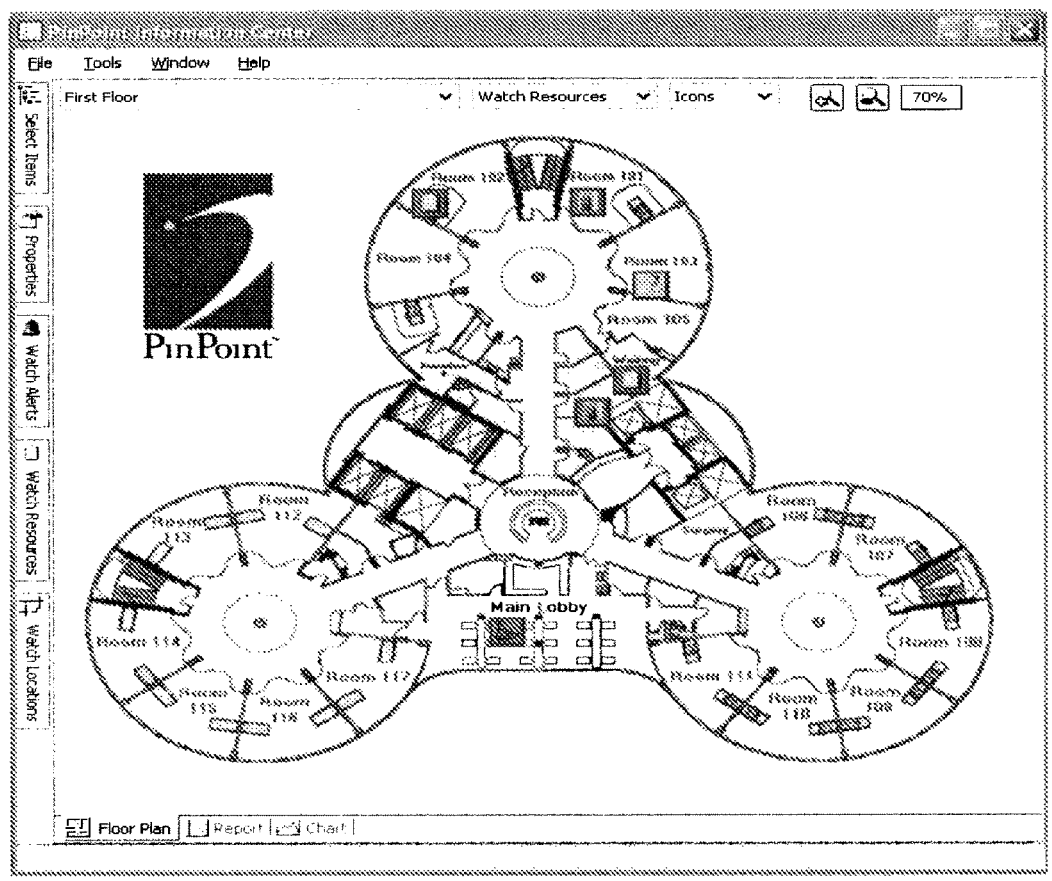

In an exemplary embodiment, FIG. 26 is a screen shot of information center 40, or a graphical user interface for asset tracing system 10. Information center 40 provides a single user interface to services and features available in a resource management software suite of asset tracking system 10. Information center 40 can be used locate resources, view alerts, run reports, create utilization charts, view floor plans and monitor real-time data pertaining to location and alert states. Information center 40 is designed to allow the maximum amount of flexibility in arranging the layout of information. Logical groupings of information are created into windows which can be easily moved about the display screen, hidden from sight, or docked together in various arrangements.

The select items window 42 provides the user with a list of all of the resources, locations, location alerts, and reports, that exist for the facility. The hierarchy selection tree structure 44 allows users to select the information they want to include when generating reports. Selection tree 44 also provides the source of items for dragging and dropping items into each of the watch windows. Information center 40 also displays information graphically through the use of charts and floor plans. Historical data can be retrieved from the database and displayed as utilization charts, which is a set of horizontal bar charts. Utilization is determined by the length of time a resource spends in a particular location.

Floor plan area 46 displays a graphical view of the facility. Predefined coordinates are used to dynamically place tag units 18, on floor plan area in proper locations. This provides a graphical means of determining the locations of both resources and alerts. Resources to be tracked are assigned an icon during tag unit 18 configuration. The icon can be used to quickly identify a resource of a certain type. Tag unit 18 can be assigned groupings such as grouping resources by department. Groups are provided with different background colors on the floor plan allowing individuals to quickly identify their resources.

Watch window 48 allows the viewing dynamic information. As tag unit 18 moves between locations, watch window 48 receives dynamic update messages, allowing them to display real-time alert and location information. The watch alerts window 50 also provides audio notifications when an alert occurs. Alerts, resources, and locations can be selected in the select items tree and dropped into their respective watch windows to monitor real-time data events as they occur.

When an alert occurs that has dropped into alert watch window 48, an audible alarm sounds at the monitoring end user device.

Information center 40 does not modify any of the data used, such as tags, locations, and alerts. Tag unit 18 locations and alerts are created in administration center 41 and dropped into respective watch windows 48 to monitor real-time data events as they occur.

Figure 30:
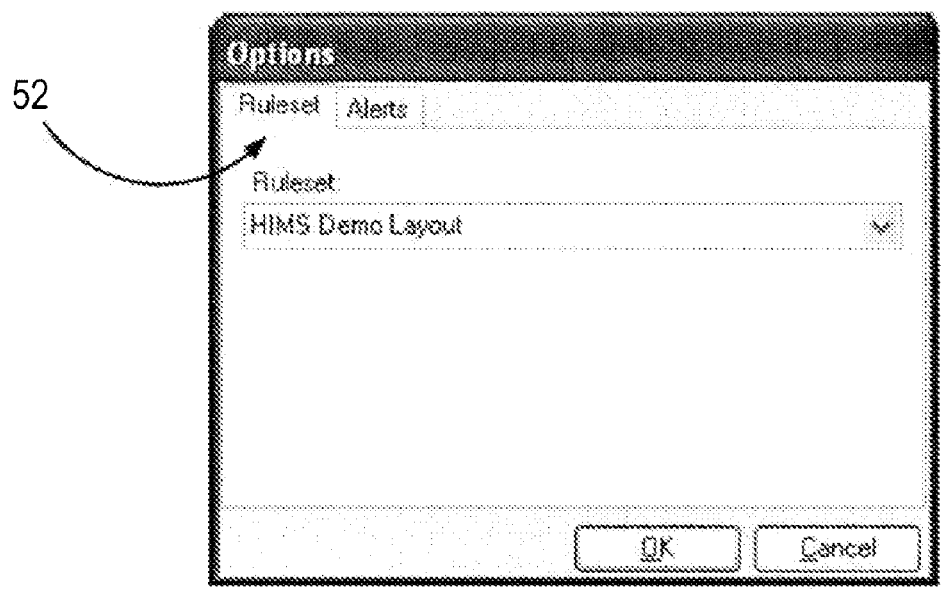
FIG. 30 is a screen shot of a rule set window to be used in information center illustrated in FIG. 26 according to another exemplary embodiment.
Figure 31:
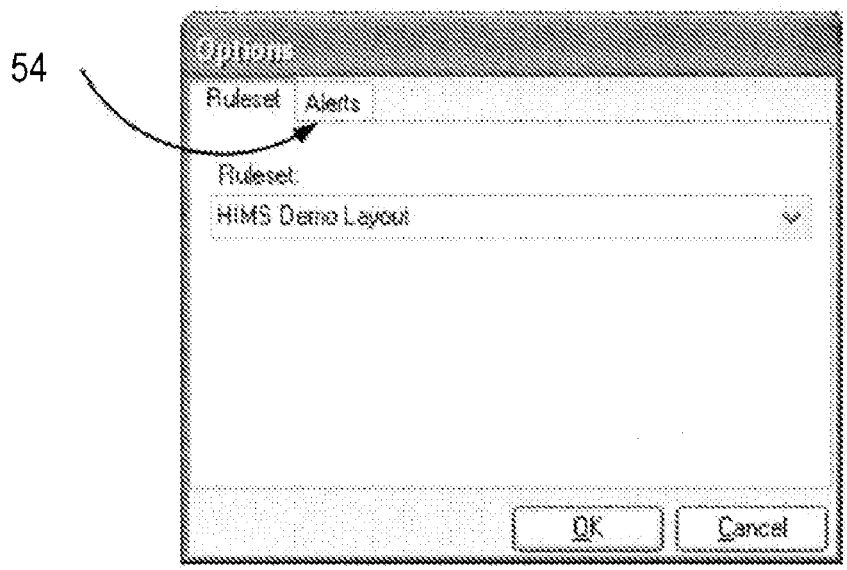
FIG. 31 is a screen shot of an alerts window to be used in an information center illustrated in FIG. 26 according to another exemplary embodiment.

In an exemplary embodiment as illustrated in FIG. 30, a rules tab 52 is used to connect information center 40 to all of the available services and to retrieve the correct location and alerts from the database. When a selection is made, information center 40 refreshes with location and alerts from the selected rule set. Real-time data from positioning service 39 such as alerts and positioning information rely upon the rule set to initialize a subscription to the service. New subscriptions are created when the rule set is changed. In another exemplary embodiment, as illustrated in FIG. 31, watch alerts window 50 is designed to play pre-recorded audio alert messages when alerts occur in the system. This audio notification can be enabled or disabled through the options dialog.

Figure 32:
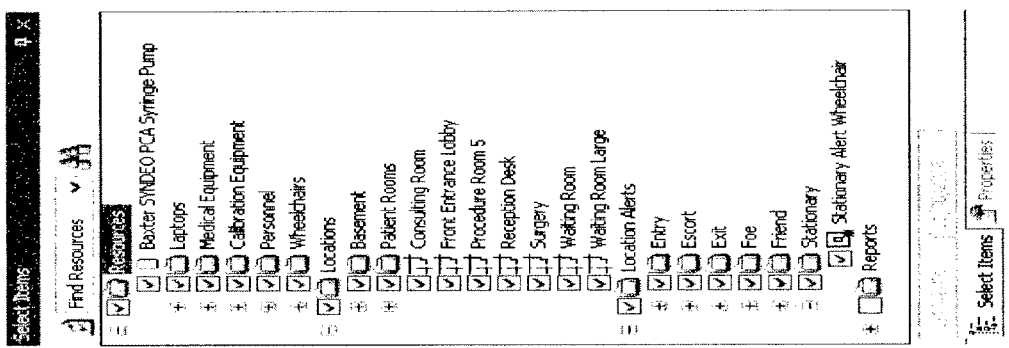
FIG. 32 is a screen shot of a select items window to be used in an information center illustrated in FIG. 26 according to another exemplary embodiment.

In an exemplary embodiment, select items window 42 as illustrated in FIG. 32, allows users to check the items they want to include in their reports. Items defined within the facility are displayed to the user in hierarchical tree structure. Items include resources, locations, location alerts, and reports. The user is able to check the items they would like to include in their report. The user may also opt to drag these items into their watch windows 48 as a selection means also.

Figure 33:
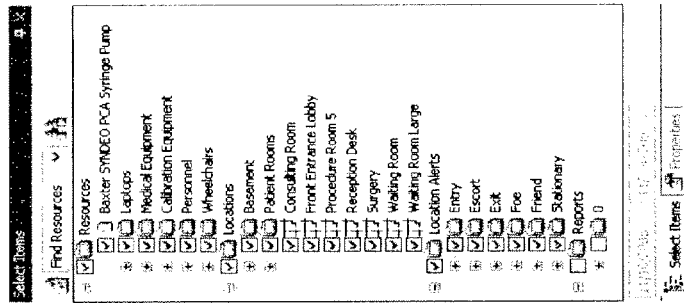

The background color of the tree control can change to light green, as illustrated in FIG. 33, when information center 40 receives an update message from administration center 41. Update messages inform information center 40 that tag unit 18 location or alert information has changed in the system. To keep information center 40 in sync with the rest of the system, the user should update information by hitting the refresh button on a browser. Once the refresh button is hit, the background color of the tree resets to white, as illustrated in FIG. 34.

In an exemplary embodiment, a properties window displays extended property information for any item selected in the tree view in regards to resource, location, location alert, or report, as illustrated in FIG. 35. In tag group properties window 54, a color of the tag group is illustrated. Color is used as background color for icons when displayed on a floor plan map. A group name for tag unit 18 is also indicated. In location properties window 56, location ID, location name, path of location, rules, etc. may be listed. In location alert properties window 58, an indication of: alert type, alert id, alert description, location of alert, resource of alert, and audible signal information is given. Report properties window 60, allows user 11 to view a report id, report name, category of report, owner of report, and user level of report. Additional information can include, creation date of report, last modification date of report, and a report value.

Figures 36, 37:
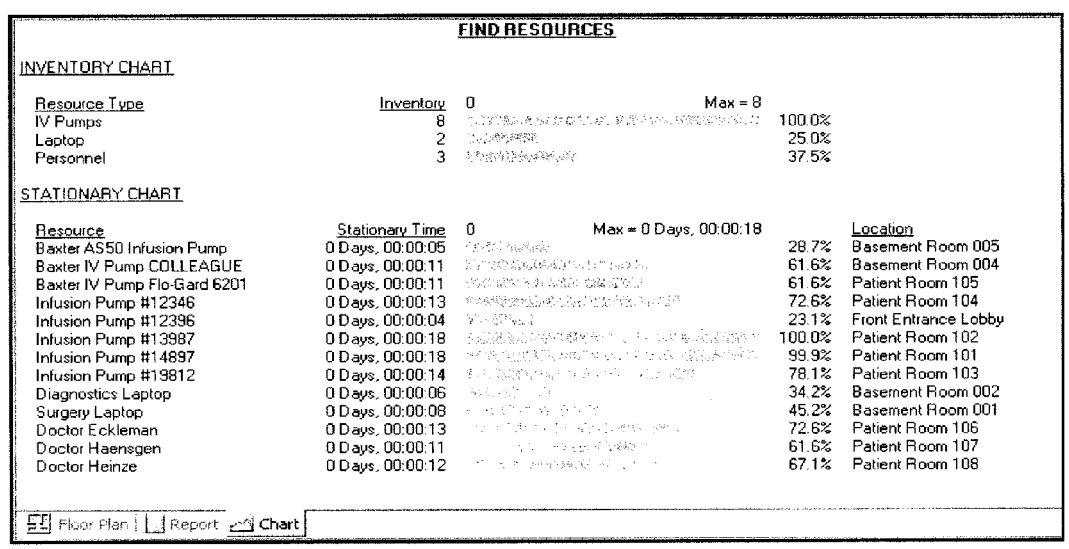
FIG. 36 is a screen shot of search results displayed as text in table format to be used in an information center illustrated in FIG. 26, according to an exemplary embodiment.
FIG. 37 and FIG. 38 are screen shots of search results displayed as chart windows to be used in the information center illustrated in FIG. 26, according to another exemplary embodiments.
Figure 38:
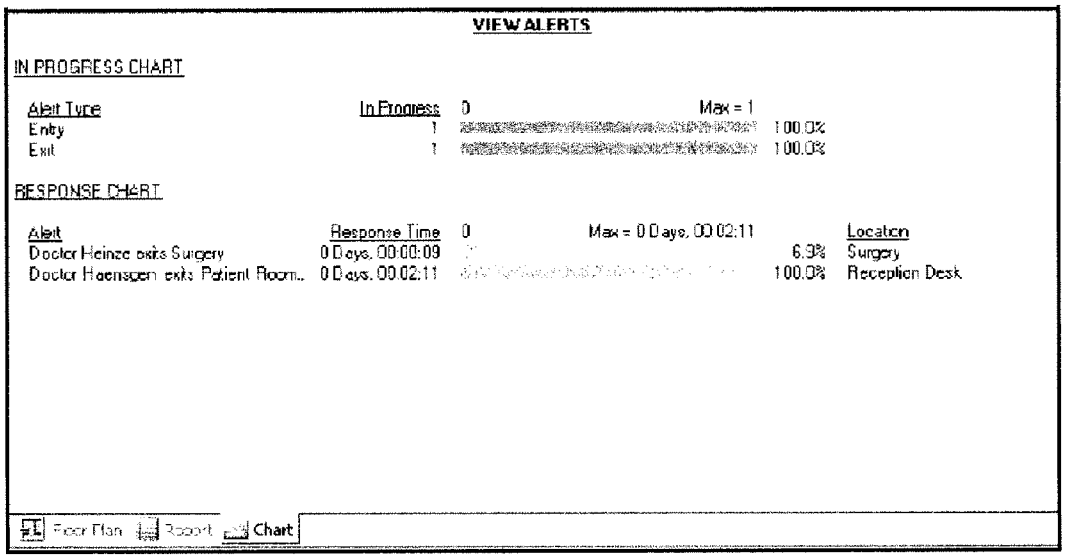

In an exemplary embodiment, a report window is populated anytime user 11 performs a search by hitting a locate button in a select items window. A report window displays search results as text in table format as illustrated in FIG. 36. The following features can be built into the display: columns for display can be selected based on report type; sort orders can be based on the report type; the column widths can be auto-sized based on information appearing in a list view; clicking on a column header can sort the information based on that column; rows can be auto-shaded to help visually separate items from one another; and an icon can be assigned to each item appearing in a list.

Figure 39:
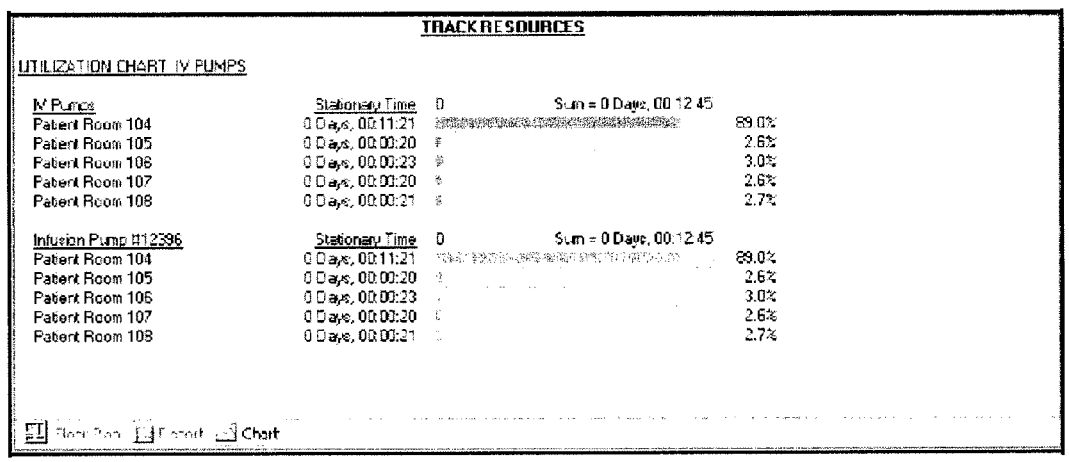
FIG. 39 and FIG. 40 are additional examples of screen shot search results displayed as chart windows to be used in an information center as illustrated in FIG. 26 according to further exemplary embodiments.
Figure 40:
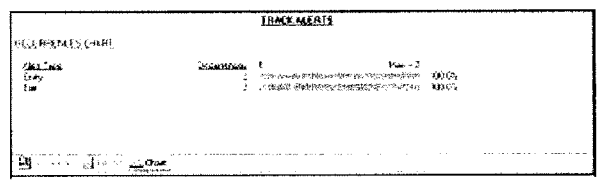

In an exemplary embodiment, a chart window can be populated anytime user 11 performs a search by hitting a locate button in a select items window, as illustrated in FIG. 37. Chart windows can display search results in a horizontal bar chart format. The following items can be built into the bar chart display: group bar charts can be formatted blue; individual bar charts can be formatted in green; bar values can be drawn normalized ensuring at least one bar is always drawn to its maximum; bar percentages can be based off of a maximum bar chart value, or a sum of bar chart values. Sample charts are illustrated in FIGS. 39 and 40.

Figure 41:
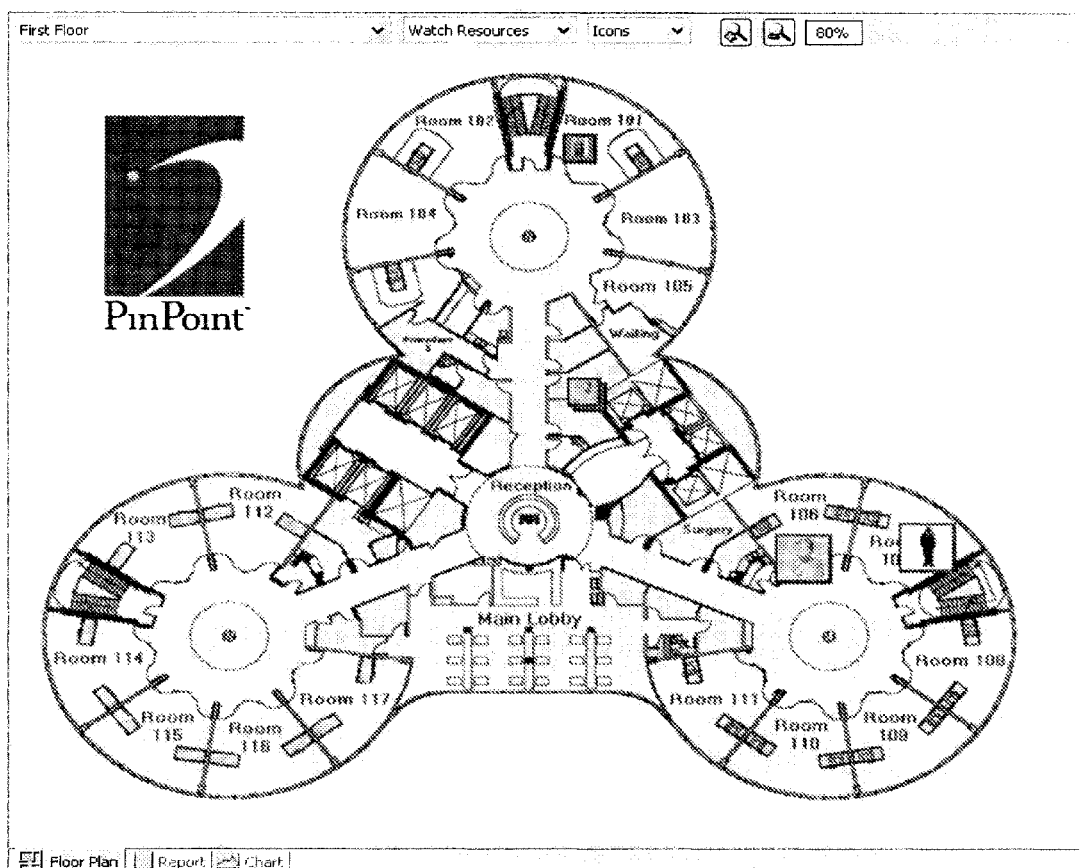
FIG. 41 and FIG. 42 are screen shots of floor plan windows to be used in information center as illustrated in FIG. 26 according to further exemplary embodiments.

In an exemplary embodiment, a floor plan window, as illustrated in FIG. 41, visually displays resources or alerts hovering over a floor plan image. User 11 can select any one floor plan at a time and a data source from which to plot the items. Items that are not located on a selected floor plan are filtered out of the display.

A floor plan window is only available if floor plans rules were created for the facility. Floor plan images can be retrieved from a database when an application is initialized. A location builder tool in administration center 41 can be used to place locations on a floor plan. A floor plan rule is set as a mapping of locations to coordinates on a floor plan image. Each time information center 40 is started or a refresh button is hit, floor plan rule sets are loaded.

Icons can be assigned to resources through administration center 41 to each resource being tracked. Icons can be displayed on a floor plan as a 32 pixel icon when it first appears and as a 16 pixel icon after the initial location change event has occurred. Whenever a resource changes location, an icon is displayed at a larger size and flashes, alerting user 11 to a location change.

Figure 42:
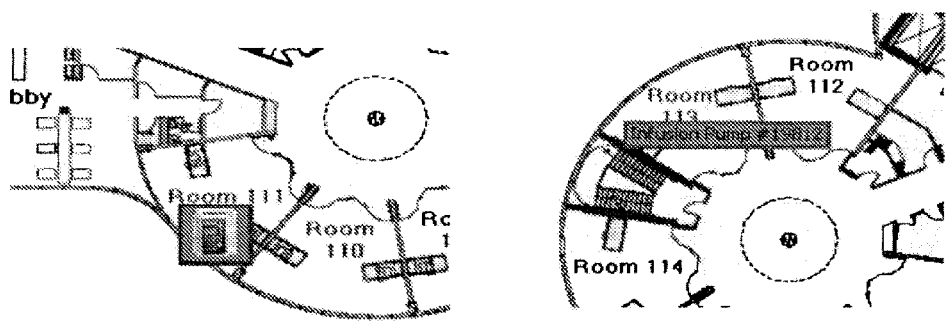

In an exemplary embodiment, a background color of the icon is based on a tag group which tag unit 18 is located. This allows user 11 to instantly recognize foreign resources in a department or to find department assets in other locations. Tag group background colors can be assigned through administration center 41. In FIG. 42, display examples are illustrated both as icons and text based locations.

Figure 43:
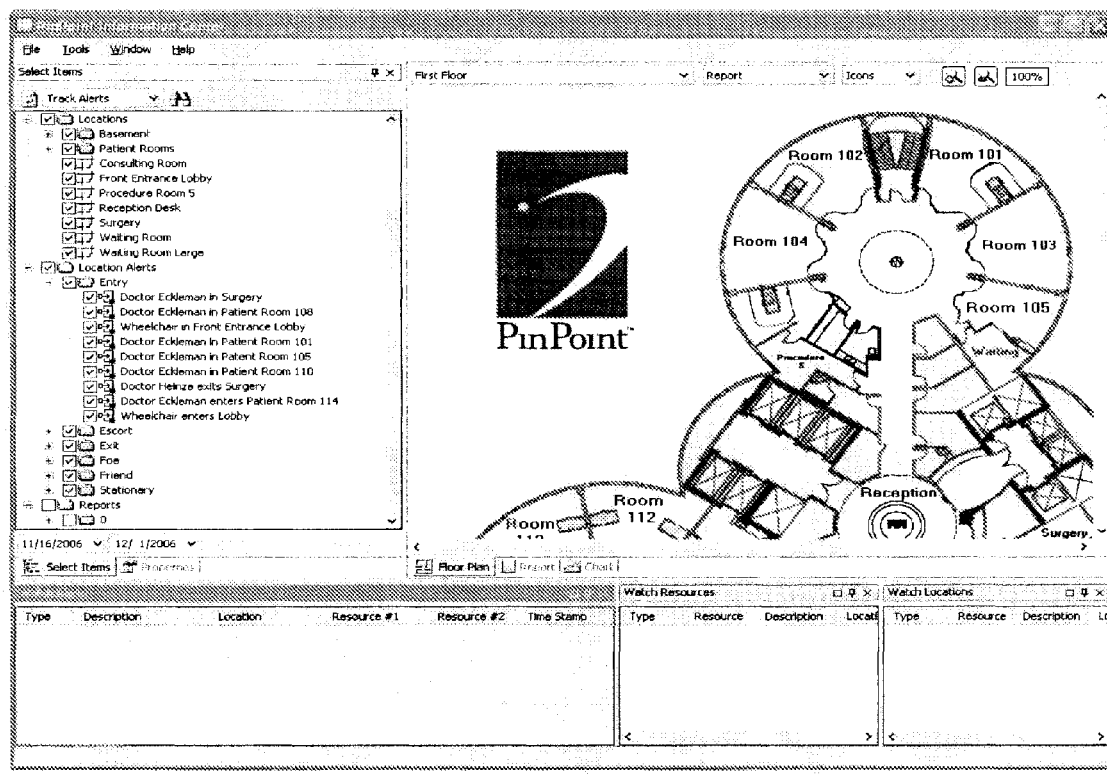
FIG. 43 is a screen shot of a watch alerts window to be used in an information center as illustrated in FIG. 26 according to another exemplary embodiment.

In an exemplary embodiment, location alerts and resources can be dragged from the selection tree and dropped into the watch alerts window 50, as illustrated in FIG. 43. Watch alerts window 50 can have the following features: watch alerts background formatted light red; only alerts "in progress" appear in watch alerts window 50; alerts can be automatically sorted by time ensuring that the most recent alerts appear at the top of a list; a right click of a mouse brings up watch manager and user 11 can view a list of all of alerts being watched; an alert can only be removed from a list by deleting a watch from a watch manager, or by clearing the offending alert in the system.

Watch alert window 50 can be the only watch window having audio support. Audio notifications can be pre-recorded WAV (Waveform audio format) files named after a corresponding alert type. User 11 can replace the WAV files with their own, provided that file names are not changed. When several alerts are triggered at once, audio notifications can be queued and played one after an other. A table of alert icons is illustrated in FIG. 44.

Figure 45:
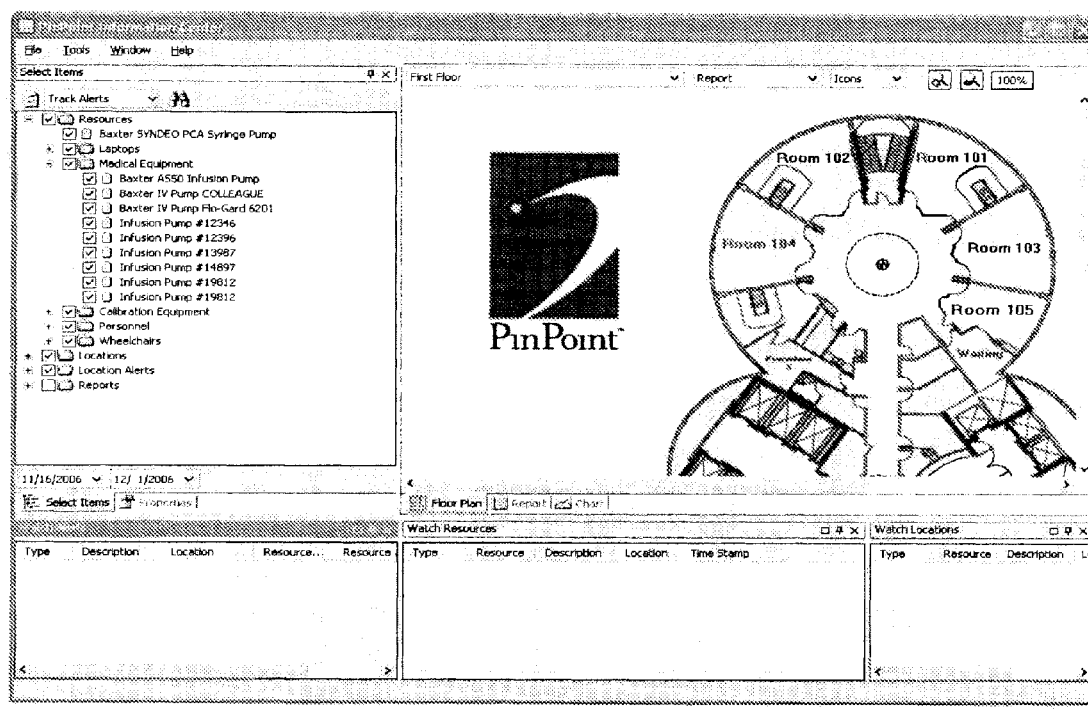
FIG. 45 is a screen shot of a watch resources window to be used in an information center as illustrated in FIG. 26 according to another exemplary embodiment.

In an exemplary embodiment, as illustrated in FIG. 45, resources can be dragged from a selection tree and dropped into a watch resources window. Watch resources window can have the following features: watch resources background can be formatted light blue; only resources that can be located by the system appear in watch resources window; resources can be automatically sorted by 'group'; a right click on a mouse brings up watch manager and user 11 may view a list of all resources being monitored; and a resource can only be removed from the list by deleting a watch from watch manager.

Figure 46:
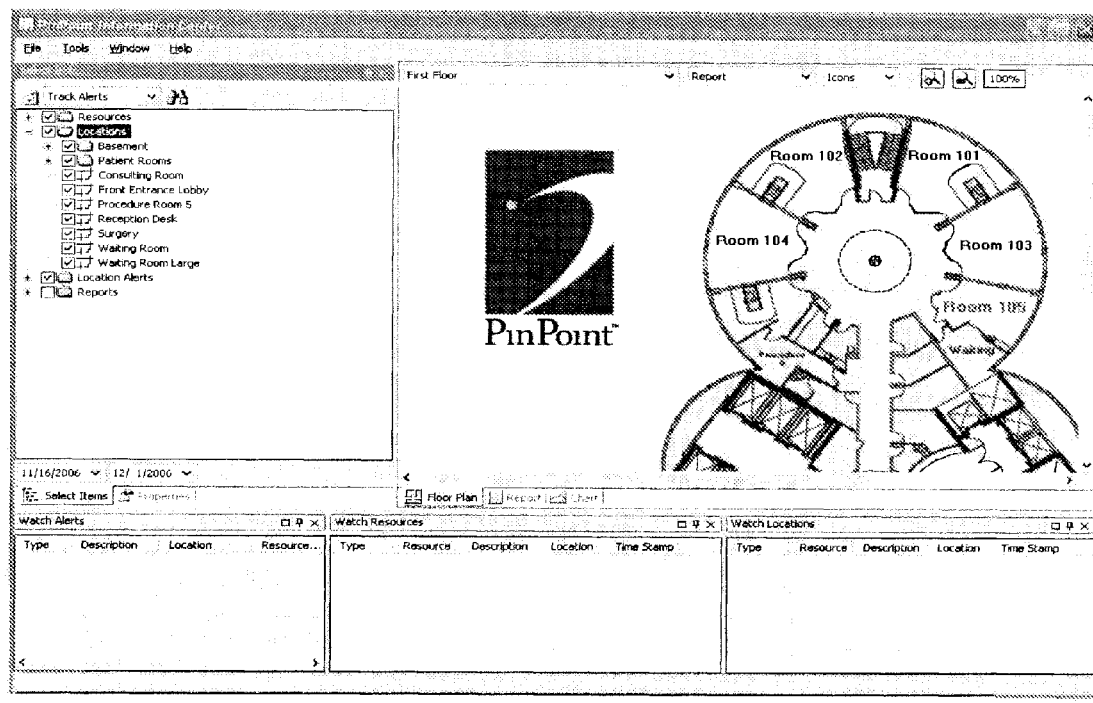
FIG. 46 is a screen shot of a watch locations window to be used in an information center as illustrated in FIG. 26 according to another exemplary embodiment.
Figure 47:
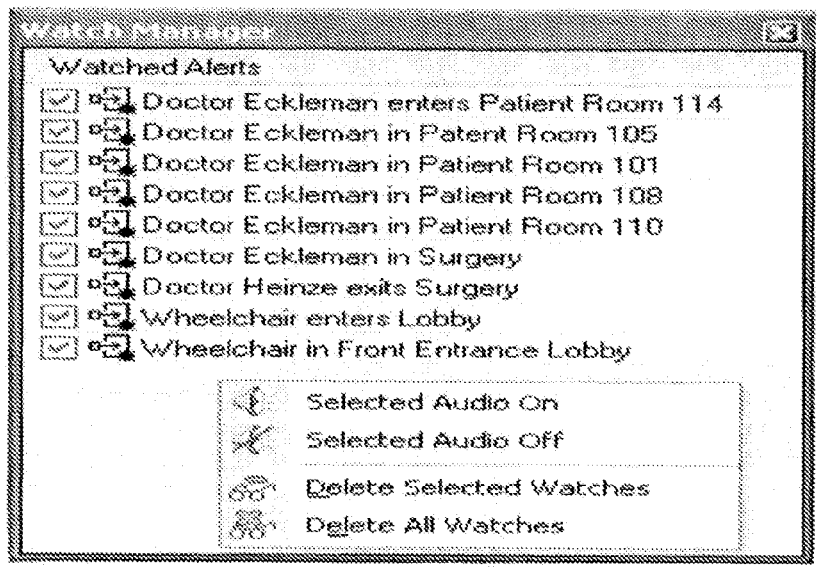
FIG. 47 and FIG. 48 are screen shots of watch windows to be used in information center as illustrated in FIG. 26 according to further exemplary embodiments.
Figure 48:
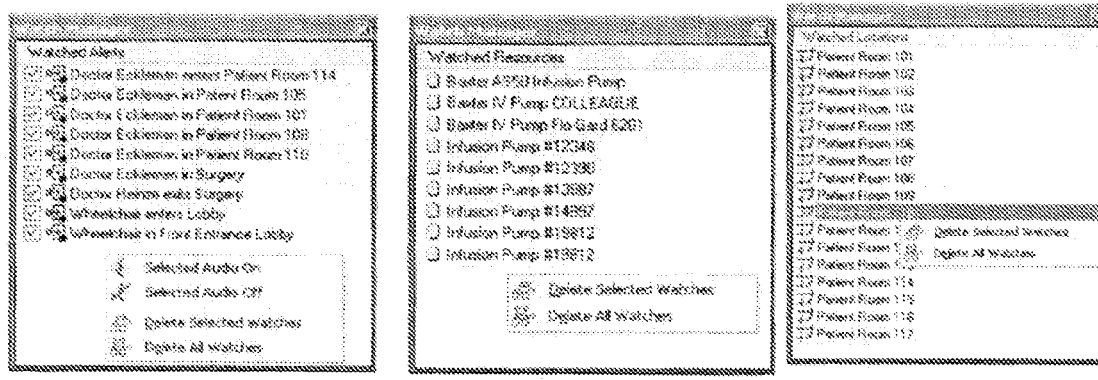

In an exemplary embodiment, locations can be dragged from a selection tree and dropped into a watch locations window, as illustrated in FIG. 46. Watch locations window can have the following features: watch locations background can be formatted light yellow; only resources can be located by asset tracking system 10 and fall into one of the watched locations appearing in a watch locations window; resources can be automatically sorted by 'group'; a right click of a mouse button can bring up a watch manager and user 11 may view all of the locations being watched; and a resource can only be removed form the list by deleting a location it resides in from watch manager In an exemplary embodiment, watch manager can be used to view and delete items being watched in any of the given watch windows as illustrated in FIG. 47. Watch manager can have the following features: the background color of watch manager can match the watch window that invoked it. Watch manager popup menu can allow user 11 to toggle individual alert audio on or off, delete selected watches, and delete all watches. Watch window examples are illustrated if FIG. 48.

In an exemplary embodiment, tag unit 18 locations can be assigned a "location type" to monitor and analyze workflow in a facility. Each room in a facility can be designated to a particular category (i.e. storage, cleaning, closet, etc.). Tag units 18 can be tracked by a time increment that tag unit 18 resides in each category. A graphical analysis (i.e. pie chart, bar graph, line graph, pictorial, etc.) can be created to allow user 11 to analyze utilization of a facility's asset(s).

In another exemplary embodiment a resource profile can be assigned to an asset during an initial set-up of an asset in a database. Facility assets may vary in regards to mobility, usage, time of usage, alarms, etc. Profiles can be created to attach to tag unit 18. These profiles can be saved in a database. As other like assets are entered into a database, a profile is entered into asset tracking system 10. A profile can be an identifying number, text string, icon, etc. and can be configured by users of the asset tracking system 10. Information contained in a profile can be any the following or combination thereof: a tamper detect enable, tamper alert early, tamper test interval, tamper test count, a motion detect enable, a static proximity announce interval, etc. Profile information for each tag unit 18 can be stored in a database for use on an as needed basis.

In an exemplary embodiment, tag unit 18 can be battery powered. Embedded in tag unit 18 can be software iterations that provide power saving modes within tag unit 18 to extend the life of the battery. Access points 16 may emit different transmissions that allow tag unit 18 to use less power with some transmissions than other transmissions.

In an exemplary embodiment, color coding of assets can be used by assigning a specific color to the following areas of the facility: floors, departments, wings, zones, rooms, etc of a facility. A color can be designated such that the assets assigned to the floor, department, wing, zone, room, etc. or any combination thereof are tracked, managed, and accounted for accordingly Tag units 18 can be programmed with a variety of information upon initial set up. In an embodiment, tag unit 18 is placed on an asset. Immediately, tag unit 18 can begin transmitting a station set identifier. The administration center pinpoint alarm center then auto enrolls tag unit 18 in the database by picking up a transmission. The user can be alerted that a new asset has been tagged. This alert may be presented on PDA 13, laptop 15, or other user end device. User 11 can choose to enter a name, a serial number, or some other identifier of the asset, and the asset can be automatically enrolled in the database.

In yet another embodiment, a list may be derived of preventative maintenance tasks for various assets. The list can be associated with specific assets and their locations. The list can be generated by equipment type, location within the facility, technology, etc. The preventative maintenance can be performed as user 11 proceeds through a building by floor, zone, area, type of equipment, etc.

In an embodiment, a virtual LAN can be used for asset tracking system 10. This can allow the facility to separate their asset tracking system traffic from the rest of their network.

In an embodiment, tag units 18 may be assigned an ID and calibrated using PDA 13 or laptop 15. The number of samples and the time frame they are taken can be tracked and analyzed over time.

In yet another embodiment, positioning service 14, as previously discussed, can be utilized to manage information regarding the assets. Positioning service 15 can perform the following or any combination thereof; receive calibration rules from an application, listen for tag unit 18 messages, determine if a tag packet is for calibration by matching it to the calibration rules, publish changes in tag unit 18 status to subscribers, etc. All information discussed in this application can be managed by positioning service 14.

In an embodiment, reference tags can be used to account for drift over time. As samples are taken for analysis and/or calibration of tag unit 18, over time, the data may shift or vary. The data collection may not have a specific start and stop time. Rather, the sample is taken over time and the drift becomes a "moving average" of the tracked data. In one embodiment, a real time calibration can be performed in response to drifts.

In an embodiment, a notification may be given to user 11 that there may not be enough assets available at a particular location in the facility. The location can be a room, zone, wing, floor, etc. A predetermined number of assets can be programmed into a database by user 11. User 11 can set an asset requirement for specific areas of the facility. Should the number of assets drop below the requirement, user 11 may then be alerted by asset tracking system 10 that asset resources are low. User 11 can then respond by replacing the depleted supply of assets.

In yet another embodiment, a facility may choose to monitor whether or not assets are being placed in proper locations and how often assets are located in incorrect locations. Software employed on station 12 can track asset locations and compare to desired locations for the assets. A report indicating the percentage of time certain assets are located in a proper place can be generated.

In another embodiment, tag unit 18 contains a motion detector. If tag unit 18 move from one location to another, a motion flag may be transmitted to a user interface or to station 12. Once a motion flag is transmitted, movement is noted within a database (preferably stored in station 12). The movement is then recorded in a database. If a motion flag is not sent by tag unit 18 and yet station 12 otherwise determines (e.g. by tracking location of the asset), tag unit 18 is flagged by station 12 as emitting inaccurate information. The correct and incorrect information can be recorded in a database. The information can be tracked and utilized for an analysis of system accuracy. An analysis can be made available to user 11 and can be displayed graphically in the form of a pie chart, bar graph, line graph, text, etc.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate electronic medical records system, incorporated for this or another purpose or by a hardwired system.

Embodiments within the scope of the present invention may include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps. Attachment A to the provisional application includes further descriptions and details related to exemplary asset tracking systems.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were illustrated and described in order to explain the principals of the invention and its practical application to enable one skilled in the art to utilize the invention in various embodiments and with various modifications as are suited to the particular use contemplated.

What is claimed is:

1. An asset tracking system, comprising:
   a station;
   a plurality of transmitting points each being at a respective fixed, known location; and
   at least one asset tag for communicating with the plurality of transmitting points, the station receiving data associated with signal strengths between the plurality of transmitting points and the at least one asset tag, the asset tag providing the data associated with the signal strengths between the transmitting points and the asset tag, wherein the station analyzes the data associated with signal strengths from the plurality of the transmitting points and determines a location of the at least one asset tag.

2. The system of claim 1, wherein the plurality of transmitting points include at least one wireless access point.

3. The system of claim 1, wherein the plurality of transmitting points include at least one reference tag, the at least one reference tag providing a fixed reference point for the asset tracking system.

4. The system of claim 1, wherein the plurality of transmitting points include at least one gateway tag, the at least one gateway tag communicating data associated with signal strengths to the station via a network connection.

5. The system of claim 1, wherein the plurality of transmitting points include at least one reference tag and at least one gateway tag, the at least one reference tag providing a fixed reference point for the at least one asset tag and the at least one gateway tag communicating data associated with signal strength to the station via a network connection, the plurality of transmitting points forming a wireless mesh network configured to wirelessly communicate tag information among the plurality of transmitting points.

6. The system of claim 1, wherein the plurality of transmitting points are synchronized to conserve power.

7. The system of claim 1, wherein the at least one asset tag is configured to sense change in its environment.

8. The system of claim 7, wherein the at least one asset tag is configured to detect motion.

9. The system of claim 1, wherein the station receives data associated with time of flight between the plurality of transmitting points and the at least one asset tag, wherein the station analyzes the data associated with time of flight from the plurality of the transmitting points.

10. The system of claim 1, wherein the at least one asset tag and at least one transmitting point of the plurality of transmitting points in battery powered.

11. The system of claim 3, wherein the at least one reference tag is configured to sense change in its environment.

12. The system of claim 11, wherein the station dynamically adjusts its location analysis to account for the sensed changes in the environment of the at least one reference tag.

13. A method of tracking an asset, the method comprising:
   receiving a transmission at an asset tag from at least one transmitting point of a plurality of transmitting points, each transmitting point being at a respective fixed, known location wherein the asset tag is affixed to an asset to be tracked;
   collecting data associated with a signal strength of the transmission; and
   transmitting the collected data from the asset tag for eventual reception by a station, wherein the station analyzes the collected data and determines a location of the asset tag affixed to the asset to be tracked.

14. The method of claim 13, the steps of the method further comprising:
   transmitting a probe request from the asset tag to the plurality of transmitting points to solicit the transmission from the plurality of transmitting points.

15. The method of claim 13, wherein the collected data being transmitted to the station is first transmitted to a transmitting point and then to the station.

16. The system of claim 15, wherein the transmitting point is a gateway tag.

17. The method of claim 13, the steps of the method further comprising:
   powering up the asset tag in response an environmental change sensed by the asset tag.

18. The method of claim 17, wherein the environmental change sensed by the asset tag is a detection of motion.

19. The system of claim 13, wherein the plurality of transmitting points form a wireless mesh network configured to wirelessly communicate tag information among the plurality of transmitting points.

20. The system of claim 19, wherein the plurality of transmitting points include at least one reference tag and at least one gateway tag, the at least one reference tag providing a fixed reference point for the at least one asset tag and the at least one gateway tag communicates data associated with signal strength to the station via a network connection.

* * * * *